(12) United States Patent
Achilles et al.

(10) Patent No.: US 7,954,051 B2
(45) Date of Patent: May 31, 2011

(54) METHODS AND APPARATUS FOR CONVERTING MARKUP LANGUAGE DATA TO AN INTERMEDIATE REPRESENTATION

(75) Inventors: Heather D. Achilles, Hudson, NH (US); Steven R. Willis, Acton, MA (US); Patrick R. McManus, Boston, MA (US); Charles R. Morgan, Manchester, MA (US); Jan-Christian Nelson, Boston, MA (US); Kenneth R. Ballou, Framingham, MA (US); Eugene Kuznetsov, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 2096 days.

(21) Appl. No.: 10/883,484

(22) Filed: Jul. 1, 2004

(65) Prior Publication Data

US 2006/0236225 A1    Oct. 19, 2006

Related U.S. Application Data

(60) Provisional application No. 60/536,039, filed on Jan. 13, 2004, provisional application No. 60/539,357, filed on Jan. 27, 2004, provisional application No. 60/548,034, filed on Feb. 26, 2004, provisional application No. 60/561,030, filed on Apr. 9, 2004.

(51) Int. Cl.
    *G06F 17/00* (2006.01)
(52) U.S. Cl. .................. 715/234; 715/237; 715/239

(58) Field of Classification Search .................. 715/234, 715/236, 237, 239
See application file for complete search history.

(56) References Cited

U.S. PATENT DOCUMENTS

| | | | |
|---|---|---|---|
| 7,013,424 B2 * | 3/2006 | James et al. | 715/239 |
| 7,356,764 B2 * | 4/2008 | Radja et al. | 715/234 |
| 7,634,002 B2 * | 12/2009 | Mukherjee et al. | 375/240.01 |
| 2003/0172348 A1 * | 9/2003 | Fry et al. | 715/513 |
| 2005/0055631 A1 * | 3/2005 | Scardina et al. | 715/513 |
| 2005/0097455 A1 * | 5/2005 | Zhou et al. | 715/513 |
| 2005/0152286 A1 * | 7/2005 | Betts et al. | 370/255 |
| 2005/0234844 A1 * | 10/2005 | Ivanov | 707/1 |
| 2006/0106837 A1 * | 5/2006 | Choi | 707/101 |
| 2009/0132910 A1 * | 5/2009 | Cseri et al. | 715/234 |

* cited by examiner

*Primary Examiner* — Stephen S Hong
*Assistant Examiner* — Matthew J Ludwig
(74) *Attorney, Agent, or Firm* — Chapin IP Law, LLC

(57) ABSTRACT

Systems, methods and apparatus provide a character process for processing markup language data, such as XML data, by receiving a character stream of markup language data and applying sequences of characters of the character stream to a set of state machines. The set of state machines includes a plurality of construct state machines responsible for processing respective markup language constructs identified by the sequences of characters. The character processor produces, from application of the sequences of characters to the set of state machines, an intermediate representation of the markup language constructs identified by the sequence of characters of the character stream of markup language data. The intermediate representation contains encoded items containing type, length, value representations representative of constructs within the character stream of markup language data.

28 Claims, 15 Drawing Sheets

PRIMARY STATE MACHINE 301

Start Element State Machine 302

Figure 7 End Element State Machine 303

Figure 8 Comment data element state machine 305

Figure 9 CDATA Element State Machine 307

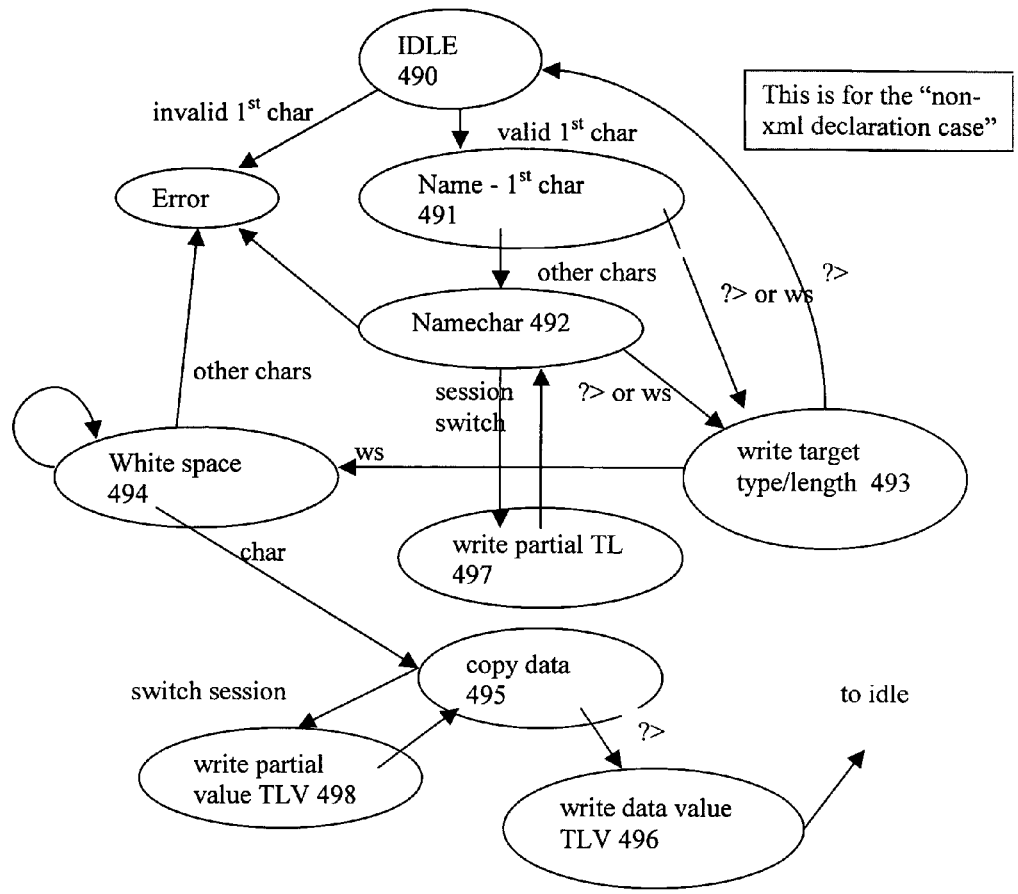
Figure 11 Processing Instruction (PI) State Machine 306 (w/o XML declaration)

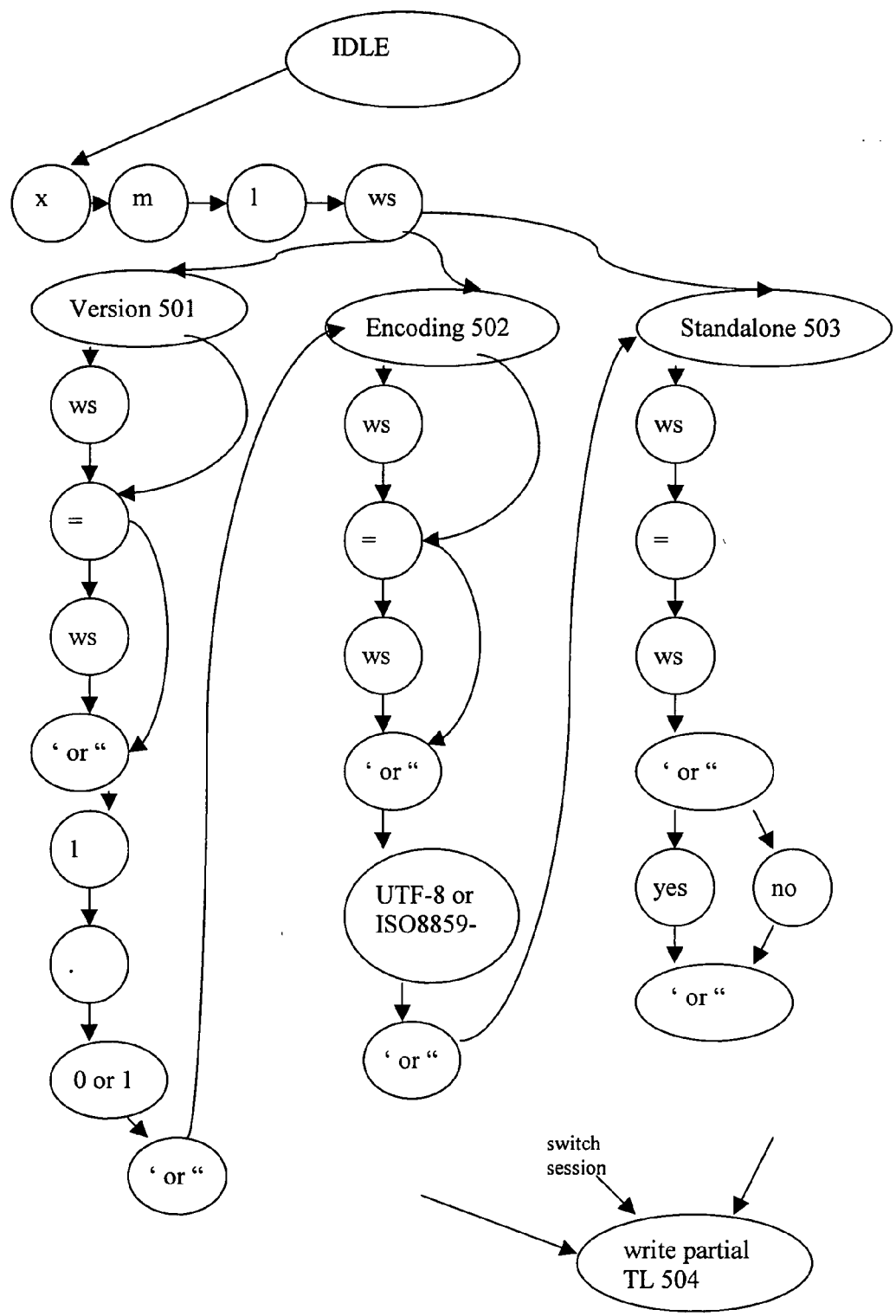
Figure 12 XML PI declaration state machine 310

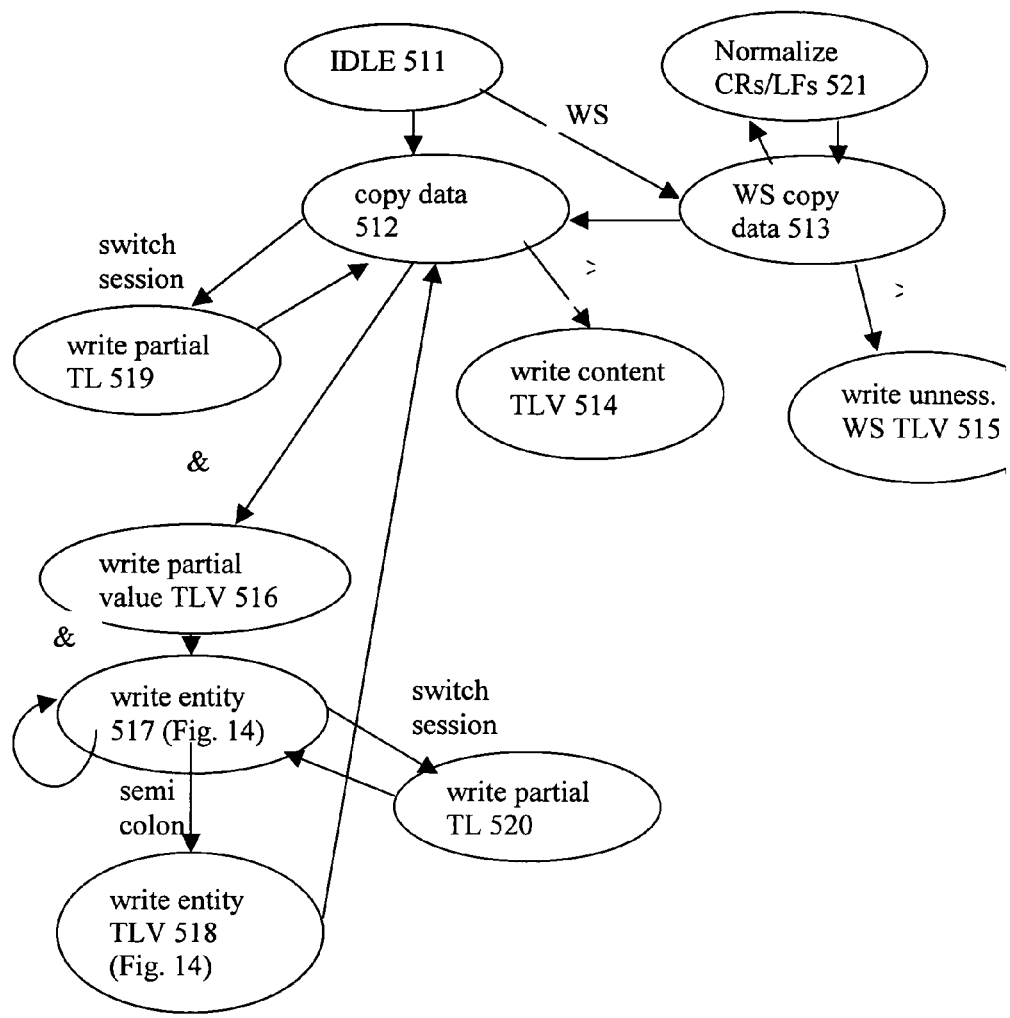
Figure 13 Content/Unnecessary White Space State Machine 309

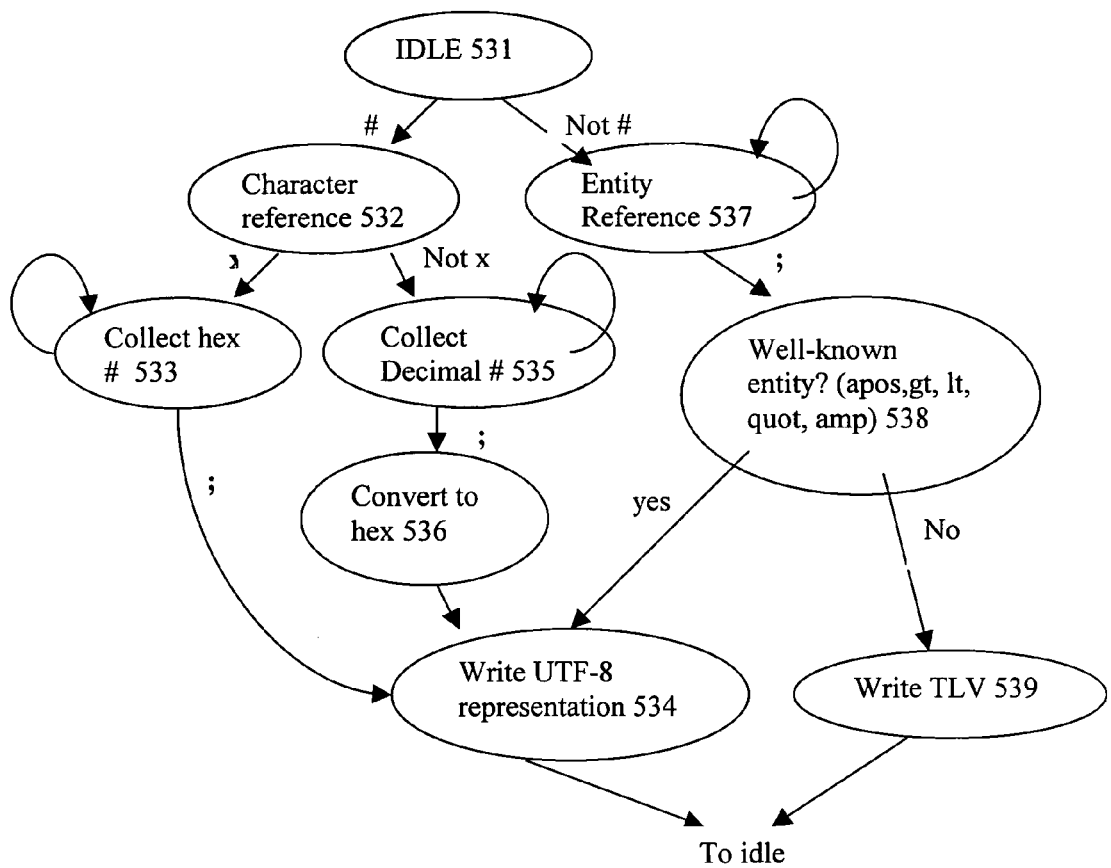
On session switch the "collect decimal", "collect hex" and "entity reference" states write a partial TLV
Figure 14 Entity State Machine 311

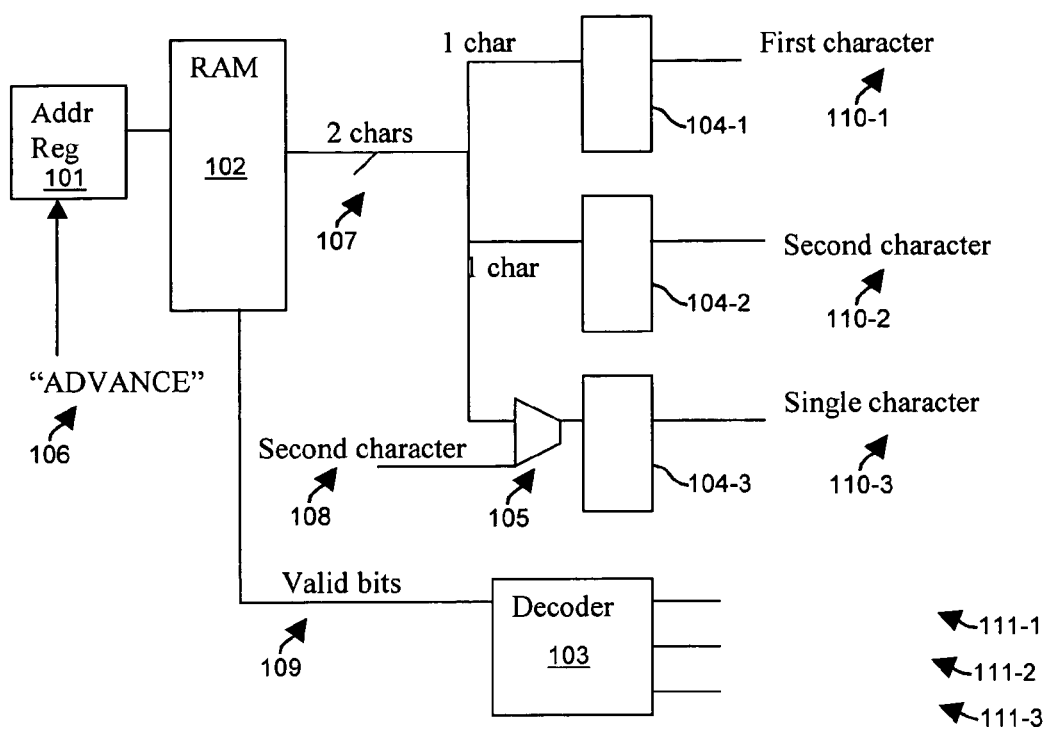
FIGURE 15 Character Provider 140

METHODS AND APPARATUS FOR CONVERTING MARKUP LANGUAGE DATA TO AN INTERMEDIATE REPRESENTATION

CLAIM TO BENEFIT OF FILING DATE OF EARLIER FILED APPLICATIONS

This Patent Application claims the benefit of the filing date of the following Provisional applications:
1) Provisional Patent Application entitled "METHOD AND APPARATUS FOR PROCESSING MARKUP LANGUAGE INFORMATION" filed Jan. 13, 2004, having Ser. No. 60/536,039.
2) Provisional Patent Application entitled "METHOD AND APPARATUS FOR MARKUP LANGUAGE PROCESSING AND TREE BUILDING" filed Jan. 27, 2004, having Ser. No. 60/539,357.
3) Provisional Patent Application entitled "METHODS AND APPARATUS FOR STREAM PROCESSING OF MARKUP LANGUAGE DATA" filed Feb. 26, 2004, having Ser. No. 60/548,034.
4) Provisional Patent Application entitled "METHOD AND APPARATUS FOR XML STREAM BASED XPATH EXPRESSION EVALUATION" filed Apr. 9, 2004 having Ser. No. 60/561,030. Each of the above referenced applications is assigned to the same Assignee as the present application. The entire teachings, figures and contents of the above-identified applications are hereby incorporated by reference herein.

RELATION TO CO-PENDING APPLICATIONS

This patent application relates to technology disclosed in the following co-pending Provisional and Utility patent applications:
5) U.S. Utility patent application entitled "METHODS AND APPARATUS FOR PROCESSING MARKUP LANGUAGE MESSAGES IN A NETWORK", Filed Dec. 22, 2003, having Ser. No. 10/745,326.
6) U.S. Utility patent application entitled "METHODS AND APPARATUS FOR PROCESSING MARKUP LANGUAGE INFORMATION", Filed Jul. 1, 2004, having Ser. No. 10/883,018.
7) U.S. Utility patent application entitled "METHODS AND APPARATUS FOR CONVERTING A REPRESENTATION OF XML AND OTHER MARKUP LANGUAGE DATA TO A DATA STRUCTURE FORMAT", Filed Jul. 1, 2004, having Ser. No. 10/883,483.
8) U.S. Utility patent application entitled "METHOD AND APPARATUS FOR STREAM BASED MARKUP LANGUAGE POST-PROCESSING", Filed Jul. 1, 2004, having Ser. No. 10/883,016.

Each of the above referenced applications is assigned to the same Assignee as the present application. The entire teachings, figures and contents of the above-identified applications are hereby incorporated by reference herein.

BACKGROUND

Conventional computer networking environments support the exchange of information and data between many interconnected computer systems using a variety of mechanisms. In an example computer-networking environment such as the Internet, one or more client computer systems can operate client software applications that transmit data access requests using one or more data communications protocols over the computer network to server computer systems for receipt by server software application(s) executing on those servers. The server software application(s) receive and process the client data access requests and can prepare and transmit one or more server responses back to the client computer systems for receipt by the client software applications. In this manner, client/server software applications can effectively exchange data over a network using agreed-upon data formats.

One example of a conventional information exchange system that operates between computer systems over a computer network such as the Internet is provided by a set of applications and protocols collectively referred to as the World Wide Web. In a typical conventional implementation of the World Wide Web, client computer systems operate a client software application referred to as a web browser. A typical web browser operates to provide hypertext transport protocol (HTTP) requests for documents, referred to as "web pages," over the computer network to web server computer systems. A web server software application operating in the web server computer system can receive and process an HTTP web page request and can return or "serve" a corresponding web page document or file specified (i.e., requested) in the client request back to the requesting client computer system over the computer network for receipt by the client's web browser. The web page is typically formatted in a markup language such as the hypertext markup language (HTML). Data exchanged between clients and servers may also be formatted in other markup languages, such as the extensible markup language (XML) or in a combination of markup languages that allows the one computer system to receive and interpret the data encoded with the markup language information within the document in order to process a response.

In addition to simply accessing web pages, more recent conventional software and networking technologies that work in conjunction with protocols such as HTTP provide complete networked or web-based "applications" or services, sometimes referred to as "web services", over a computer network such as the Internet. Conventional web services architectures allow server-to-server connectivity for business applications. Presently, there is a convergence to the use of XML to encode data that is exchanged between network-based applications such as the world-wide-web, web services, or other network-based applications since XML is extensible and flexible and can be used to encode data of any type.

Conventional XML processing technologies that operate within computer systems generally rely on software processing to allow the computer systems (e.g., web servers) to interpret and process the XML-encoded data in a variety of ways. Several conventional XML technologies allow a software application to access (e.g., extract) XML-encoded data for application processing purposes. As an example, a web server can use conventional XML software processing technologies such as the Document Object Model (DOM) or Simple Application programming interface for XML (SAX) to parse XML encoded data (referred to sometimes as XML documents) to gain access to the XML data. In addition, other XML-related technologies such as the eXtensible Stylesheet Transformation Language (XSLT) allow a developer of an XML-aware software application to define transformations of XML encoded data from one data format to another. Extensible Stylesheet Transformations (XSLT) is a language for converting, or transforming, documents written in XML into other formats, including HTML and other XML vocabularies. An XSL document is used to transform an XML document, or a portion of data contained in such a document, from one format to another (e.g., XML to HTML). A schema is a description in a meta-language specifying the acceptable syntax of an XML vocabulary. A schema document is used to validate an XML document and guarantee its syntax is correct. A filter is an XSLT document used to produce a decision on the acceptability of an input XML document based on an arbitrary set of criteria. A filter verifies an input document based on semantic or other content (transformed or not transformed) not typically related to syntax, and so differs from a schema validation in this way.

SUMMARY

Conventional mechanisms and techniques for processing data encoded in a markup language such as, for example, XML, suffer from a variety of deficiencies. In particular, such conventional markup language processing techniques are software-based and are quite verbose and burdensome on the processing resources of server computer systems, resulting in the introduction of bottlenecks in the flow of information between enterprise applications. Conventional software applications that use XML encoded data are required to include software routines to receive, parse, transform and otherwise process the raw, character-based XML data using the wide array of conventional software tools available for such purposes, thus resulting in significant overhead to such software applications.

As an example, there are numerous XML processing operations that a server may be required to apply on a received XML document prior to being able to perform the intended application level processing provided by that server on the application data encoded within the XML document. By way of example, depending upon the robustness of the server application, when XML data is received at a server, the server may be required to determine if the XML document is well-formed (i.e., that it contains proper XML formatting and syntax). In addition, the server may perform XML schema validation processing to ensure that the server is properly equipped to process all of the relevant tagged XML data in the document. Still further, a server may be required to perform security processing such as performing XML signature validation, decryption or encryption of XML encoded data, authentication of XML encoded secure digital certificates, and so forth. Since XML encoded data is inherently text-based, XML documents can become very large in size. All of this conventional overhead XML processing is software based and places a significant burden on memory and processing resources within a server or other computer system when dealing with large markup language documents that are many megabytes in size, or when dealing with heavy volumes of smaller documents. However, all of this conventional processing is often required when dealing with XML and other markup language encoded data in order to provide robust and fault tolerant data processing and to provide access to the encoded application data contained within the XML document.

Furthermore, conventional markup language processing techniques are typically implemented in software within a server computer system. As an example, software implementations of XML processing tend to be tightly integrated with operation of the server application, such as an XML-based web services application. As XML standards evolve and change over time, re-engineering of the XML portions of the server software application to take advantage of, or adapt to, changing XML standards can be quite costly. An organization must both purchase and re-install a new version of the XML processing software to adapt the software to changing XML standards, or if the software is developed in-house, the organization must undertake the task of re-tooling (designing, coding, testing and debugging) the server application code itself to account for changing XML standards. Either situation can be very costly to an organization operating XML-based applications.

Generally then, conventional implementations of markup language data processing incur significant overhead due to the need of a computer to parse and manipulate XML-encoded data, a data encoding which is text-based, verbose and inefficient, to perform many basic processing operations. The performance overhead of such operations performed within a conventional server-based implementation can negate the business advantages of their deployment. Moreover, it is not easy or straightforward to perform a sequence of actions on an XML document consisting of one or more transformations, schema validations, and filters in a server-based architecture due to the significant software complexities of such operations. Conventional XML processing tools such as the DOM provide software-based conversion of the XML data into a data structure such as a DOM tree, but such conventional XML conversion tools do not provide an intermediate representation other than the DOM tree that is easy to manipulate for varying purposes.

Embodiments of the invention significantly overcome these and other deficiencies associated with conventional markup language processing implementations. To do so, embodiments of the invention include systems, methods and apparatus that provide a character processor for processing of markup language for conversion into an easy to process intermediate representation. Generally, the character processor of this invention converts one or more character streams of markup language data, such as XML data formatted according to an extensible markup language (XML) specification, into corresponding intermediate representations (one for each respective XML data stream) by receiving the character stream of markup language data and applying sequences of characters of the character stream to a set of state machines embodied within the character processor. In one embodiment, the set of state machines includes a plurality of construct state machines responsible for processing respective markup language constructs identified by the sequences of characters, such as construct state machines to process different types of XML constructs. The character processor in one embodiment operates a primary state machine to control invocation of the respective construct state machines to process different types of XML constructs encountered during reception of the character stream of XML data. This character processor produces, from application of the sequences of characters to the set of state machines, an intermediate representation of the markup language constructs identified by the sequence of characters of the character stream of markup language data.

The intermediate representation contains encoded items representative of the original stream of markup language data. In one embodiment, the encoded items contain type, length, value (TLV) or type, length, attribute (TLA) representations of the XML constructs identified by application of the sequences of characters of the character stream to the set of state machines. For purposes of description of embodiments of the invention, the term "encoded item" as used herein includes type, length, value (TLV) and/or type, length, attribute (TLA) encoded items representations. In addition, for ease of description, both TLV and TLA representations are considered substantially equivalent and thus type, length, value (TLV) will be used throughout this description. It is to be understood than that type, length, value (TLV) encoded item representations include both TLV and TLA representations. Examples of conversion of XML markup language data into TLV encoded item representations will be provided herein. Generally however, a TLV encoded item contains at least two fields; a Type field (the "T" in TLV) that indicates a type of markup language construct being represented, and a Length field (the "L" in TLV) that contains a length of data contained in a Value or Attribute fields (the "V" in TLV for Value, or the "A" in TLA for Attribute). As a very brief example, if an XML comment field appears in an XML data stream as follows:

<!--This is a comment-->

The set of state machines operates a comment state machine to convert the XML comment above into the following TLV encoded item shown in the second row of the table below:

| T | L | V |
|---|---|---|
| Comment | 17 | This is a comment |

In one configuration, each construct state machine outputs a sequence of one or more encoded items (only one in the above example) that represent the XML construct that the particular construct state machine is responsible for processing. As a result, the character processor converts XML data or documents into a corresponding TLV or TLA representation.

Embodiments of the character processor disclosed herein include the ability to perform data conversion on the XML data as it is converted into the intermediate encoded item representations. As an example, the character processor can normalize the markup language data by removing end-of-line and line-feed characters and can further remove unnecessary white space. The character processor in one embodiment converts the input markup language data from one data format into another data format such as conversion to UTF-8 data format. Furthermore, the character processor in one embodiment checks the syntax and well-formedness of the markup language data and can perform validation such as start element and end element and/or prefix/suffix validation.

According to other embodiments of the invention, the character processor disclosed herein is capable of handling multiple markup language data communication sessions. As an example, if there are multiple streams of XML data being transported through a computerized device equipped with the character processor configured in accordance with embodiments of the invention, the character processor is able to recognize a switch between the different flows of markup language data associated with each markup language data communications session.

In particular, in one embodiment of the invention the character stream of markup language data is associated with a respective markup processing session and there are a plurality of respective markup processing sessions being processed simultaneously by a computerized device equipped with the character processor. Each markup processing session has an associated character stream of markup language data. During application of sequences of characters of a first character stream associated with a first markup processing session to the set of state machines, the character processor identifies a session switch event (e.g., an interrupt or other event or signal that may be generated, for example, by the arrival of packets from a different TCP session containing markup language data). The session switch event indicates that sequences of characters of a second character stream associated with a second respective markup processing session are to be processed by the set of state machines within the character processor.

In response to a session switch event, within a current state machine that is processing the sequence of characters for the first character stream (the current stream to be replaced with the second or new stream), the character processor produces a partial encoded item (e.g., a special TLV indicating a session state switch) associated with a type of construct being processed within the current state machine, such that the intermediate representation of the markup language constructs associated with the first character stream (i.e., currently being produced by the character processor) indicates a transition of processing of the first markup processing session to the second markup processing session by the set of state machines. In addition, the character processor saves the state of the first markup processing session for the first character stream in a first session state. Prior to processing the character stream of the second markup processing session, the character processor determines if a second session state exists that is associated with the second markup processing session (i.e., that may have been previously saved if the second markup processing session was formerly interrupted), and if so, the character processor loads the second session state for use by the set of state machines to process the second stream. Thereafter, the character processor performs, for sequences of characters of a character stream of the second markup processing session, the operations of receiving the character stream of markup language data, applying the sequences of characters of the character stream of the second markup processing session to a set of state machines, and producing an intermediate representation of the markup language constructs identified by the sequence of characters of the second character stream of markup language data. In this manner, the character processor configured according to embodiments of the invention can be multiplexed between a plurality of markup language data communication sessions.

Other embodiments of the invention enable the character processor to process more than one character of the character stream of markup language data at one time. In particular, in one embodiment of the invention, during application of sequences of characters of the character stream to a set of state machines, the character processor obtains at least two characters from the character stream of markup language data and applies the characters to the primary state machine, and also during invocation of the respective construct state machines, during one state machine cycle. In this manner, embodiments of the invention allow each state machine to process state transitions at least two characters at one time. Furthermore, the state machines can invoke each other, such that control can be transferred from one respective construct state machine to another (or back to the primary, if need be), without control having to return to the primary state machine after completion of each construct state machine.

Other embodiments of the invention include a markup language processing device such as any type of computerized device such as a computer system, peripheral device (e.g., a circuit card or co-processor that can be installed into a computerized device for processing XML data, such as an XML co-processor), a network or data communications device, switch, router or the like configured with software and/or circuitry that implements a character processor as summarized above and as explained in further detail below, to process any or all of the method operations disclosed herein as embodiments of the invention. Still other embodiments of the invention include software or firmware programs that can operate alone or in conjunction with each other in a computerized device to perform the method embodiment steps and operations summarized above and disclosed in detail below. Preferred embodiments are implemented in hardware for speed of processing however, though software implementations are considered to be embodiments of the invention as well.

One such software embodiment comprises a computer program product that has a computer-readable medium including computer program logic encoded thereon that, when performed in a computerized device having a coupling of a memory and a processor, programs the processor to perform the character processing operations disclosed herein as embodiments of the invention to carry out character processing on markup language data, such as XML or upon other markup languages. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips or as an Application Specific Integrated Circuit (ASIC). The software or firmware or other such configurations can be installed onto the computerized device to cause the computerized device to perform the techniques explained herein as embodiments of the invention. Thus, software code written upon any computer readable medium that contains instructions to carry out novel combinations of processing steps as explained herein, or any equivalents thereto, is considered an embodiment of the invention.

It is to be understood that the system of the invention can be embodied strictly as a software program, as software and hardware, or as hardware alone (e.g., such as an XML co-processor on a chip, or in a circuit card, or as part of a network device). Example embodiments of the invention may be implemented within computer systems, network devices, processors, circuits, ASICs, FPGAs, and/or computer program products and/or software applications manufactured by Datapower Technology, Inc. of Cambridge, Mass., USA. Co-pending U.S. patent application Ser. No. 10/883,018 discloses a markup language processing device within which embodiments of the present disclosed invention may operate.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

FIG. 11 is a state machine diagram for a processing instruction state machine (without an XML Declaration) that operates to process XML markup language within a character processor configured in accordance with one embodiment the invention.

FIG. 12 is a state machine diagram for an XML processing instruction declaration state machine that operates to process XML markup language within a character processor configured in accordance with one embodiment the invention.

FIG. 13 is a state machine diagram for a content (and unnecessary white space) state machine that operates to process XML markup language within a character processor configured in accordance with one embodiment the invention.

FIG. 14 is a state machine diagram for an entity state machine that operates to process XML markup language within a character processor configured in accordance with one embodiment the invention.

FIG. 15 is an example architecture of a character provider that operates to provider multiple characters per cycle to state machines operating in a character processor configured in accordance with one embodiment the invention.

DETAILED DESCRIPTION

Figure 1:
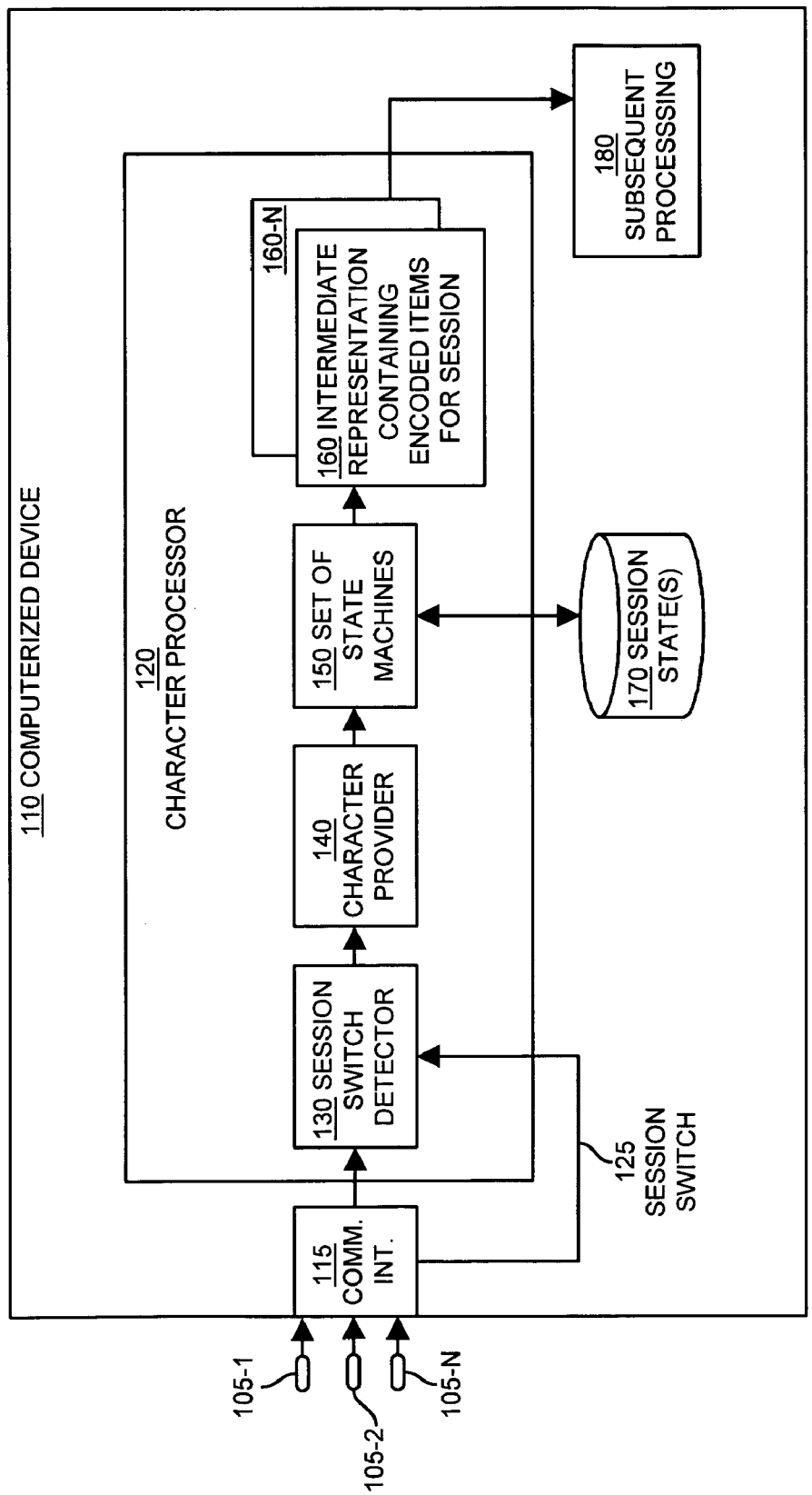
FIG. 1 illustrates an example of a computerized device including a character processor configured according to one embodiment of the invention.

Embodiments of the invention provide a character processor that implements a method for converting a character stream of markup language data, such as XML data formatted according to an extensible markup language (XML) specification, into an intermediate representation containing encoded items representative of the original stream of markup language data. In one embodiment, the encoded items contain type, length, value (TLV) or type, length, attribute (TLA) representations of the XML constructs identified by application of the sequences of characters of the character stream to the set of state machines. As a result, the character processor converts XML data or documents into a corresponding TLV or TLA representation for subsequent processing in TLV or TLA format. The conversion is performed in the character processor by receiving the character stream of markup language data and applying sequences of characters of the character stream to a set of state machines embodied within the character processor.

In one embodiment, the set of state machines includes a plurality of construct state machines responsible for processing respective markup language constructs identified by the sequences of characters, such as construct state machines to process different types of XML constructs. The character processor operates a primary state machine to control invocation of the respective construct-specific state machines to process different types of XML constructs encountered during reception of the character stream of XML data. This character processor produces, from application of the sequences of characters to the set of state machines, an intermediate representation containing encoded items representative of the markup language constructs identified by the sequence of characters of the character stream of markup language data.

In embodiments of the invention, the intermediate representation of encoded item output can include normalized data. As an example, the character processor in one configuration processes entities in each individual state machine and can replace predefined entities with their UTF-8 value and can verify that multi-byte UTF-8 characters adhere to the UTF-8 standard. In addition, embodiments can normalize end of line characters to a value such as, for example, 0x0A. In one embodiment, the following line feed and end-of-line normalization can be done as well:

0xD→0xA
0x0D 0x0A-0xA
0x85→0xA
0x0D0x85→0xA
0x2028→0xA

For purposes of description of embodiments of the invention, type, length, value (TLV) and type, length, attribute (TLA) encoded items representations are considered equivalent and type, length, value (TLV) will be used throughout this description. It is to be understood then that type, length, value (TLV) encoded item representations include both TLV and TLA representations. Examples of conversion of XML markup language data into TLV encoded item representations will be provided shortly.

In one configuration, the TLV intermediate representation provides a set of "Types" that generally correspond to the different types of XML constructs that are encountered within character streams of XML markup language data assuming the markup language data were formatted according to a standardized XML markup language specification. In alternative configurations, the set of types can be configured to correspond to constructs of different markup languages other than XML, such as HTML, SGML or another markup language. However, for purposes of description of embodiments of the invention, the set of types available for TLV encoded items in one example embodiment are used for conversion of XML and generally correspond to the following construct types:

1. Start tag prefix
2. Start tag local part
3. End tag prefix
4. End tag local part
5. Empty element
6. PI target
7. PI Data
8. Comment
9. Attribute name prefix
10. Attribute name local part
11. Attribute Value
12. XML version number
13. XML encoding value
14. XML declaration standalone value
15. Text
16. DTD Name
17. DTD Public ID
18. DTD System ID
19. DTD Subset
20. Entity
21. Close Start Element
22. Namespace prefix
23. Namespace URI
24. Unnecessary Whitespace Example List of TLV "Types" for XML Constructs As the character processor operates as explained herein and encounters XML constructs within a character stream of XML markup language data, it identifies the construct using state machines and produces appropriate TLVs containing codes or strings associated with the aforementioned "Types". For each TLV, the character processor obtains a portion of the XML character stream of data corresponding to the identified construct as a "Value" portion for the TLV. The character processor establishes or calculates the "Length" field "L" of the TLV to be equal to the number of alphanumeric characters within the "Value" portion copied, obtained or otherwise extracted from the character stream of markup language data. In other words, according to embodiments of the invention, for each XML construct identified in the character stream of markup language data, the character processor produces a sequence of one or more TLV encoded items containing types selected from the list above, and each includes a length field indicating how many alphanumeric characters are contained in the value field. The character processor places the appropriate characters representing the identified construct within the value field. In some cases, the value field will be null and only the type and length fields are used, as in the case of a TLV that represents the close or "end" of a start element or an empty element. Those familiar with XML syntax and structuring constructs will readily identify the various XML constructs in the list of TLV Types given above.

Prior to description of the operation of the character processor and its associated state machines in accordance with various embodiments of the invention, a brief example of XML constructs that the character processor converts to corresponding TLV sequences is provided below to clarify what is meant by converting XML constructs to TLV encoded items. The following example of XML inputs show samples of different types of actual XML constructs containing data and their corresponding TLV encoded item equivalents as produced by a character processor configured in accordance with embodiments of the invention:

DTD TLVs:
  XML input:
    <!DOCTYPE dtdname SYSTEM xyz_literal [random data]>
  TLV equivalent:

| TYPE | Length | Value |
| --- | --- | --- |
| DTD Name | 7 | dtdname |
| DTD System URI | 11 | xyz_literal |
| DTD subset | 11 | random data |

XML Declaration TLVs:
  XML input:
    <?xml version='1.0' encoding='UTF-8' standalone='no'?>
  TLV equivalent:

| TYPE | Length | Value |
| --- | --- | --- |
| XML version | 3 | 1.0 |
| XML Encoding | 5 | UTF-8 |
| XML standalone | 2 | no |

Comment TLVs:
    XML input:
        <!--This is a comment-->
    TLV equivalent:

| TYPE | Length | Value |
|---|---|---|
| Comment | 17 | This is a comment |

PI TLVs:
    XML input:
        <?proc_inst data_for_instruction?>
    TLV equivalent:

| TYPE | Length | Value |
|---|---|---|
| PI Target | 9 | proc_inst |
| PI Data | 20 | data_for_instruction |

Element & Attribute TLVs:
    XML input:
        <rtz:elem_name qre:attr1='123_value'>
    TLV equivalent:

| TYPE | Length | Value |
|---|---|---|
| Start Tag Prefix | 3 | rtz |
| Start Tag Local Part | 9 | elem_name |
| Attribute name prefix | 3 | qre |
| Attribute name suffix | 5 | attr1 |
| Attribute value | 9 | 123_value |
| Close Start element | 0 | |

Namespace & Empty Element TLVs:
    XML input:
        <root xmlns:trhjj='http://www.xyz.com'/>
    TLV equivalent:

| TYPE | Length | Value |
|---|---|---|
| Start Tag Local Part | 4 | root |
| Namespace prefix | 5 | trhjj |
| Namespace URI | 18 | http://www.xyz.com |
| Empty Element | 0 | |

Content & Entity TLVs:
    XML input:
        &hyzz78; text and entity
    TLV equivalent:

| TYPE | Length | Value |
|---|---|---|
| Entity | 6 | hyzz78 |
| Text | 16 | text and entity |

*Note: Unnecessary white space TLV is content that has only Linefeeds, tabs, spaces or carriage returns.

The aforementioned XML to TLV encoded item conversion examples are produced by operation of state machines within a character processor in accordance with embodiments of the invention. Attention is now directed to the attached Figures for a description of the character processor architecture and modes of operation.

FIG. 1 illustrates a computerized device 110 configured with a character processor 120 in accordance with an example embodiment of the invention. The computerized device 110 includes a communications interface 115 that may be coupled to a communications network 101 such as the Internet, or a local or wide area network. The computerized device 110 in this example receives a plurality of character streams of markup language data 105-1 through 105-N from the network 101, each of which is associated with a respective markup processing session. As an example, the character streams of markup language data 105-1 through 105-N may be received by the communications interface 115 within the computerized device 110 as sequences of packets over respective communications sessions such as Transmission Control Protocol (TCP)/Internet Protocol (IP) sessions from remote computer systems (not specifically shown). Alternatively, any type of communications protocol or method can provide one or more streams of markup language data to the computerized device 110 for receipt by the character processor 120. The character processor 120 can also be embedded within an XML processing system and the streams of XML data 105 can be received from applications or hardware within the computerized device 110 and no network is required for such an implementation. For purposes of this example however, a network 101 provides the streams of markup language data 105 to the communications interface 115.

The communications interface 115 may be any type of network port or software interface or other type of data Interface capable of receiving the streams of markup language data 105. The communications interface 115 forwards at least one character stream of markup language data 105 to the character processor 120 for processing as explained herein. As will be explained later, the communications interface 115 in this example is capable of indicating (e.g., via access to information in a data communications protocol stack) to the character processor 120 which particular markup language data communications session (i.e., which particular character stream 105-1 through 105-N) is currently being provided to the character processor 120 at any point in time. This is accomplished via the sessions switch event 125.

In this example embodiment, the character processor 120 includes a session switch detector 130 that receives, as input, the character stream of markup language data 105 and the session switch event 125. The session switch detector 130 forwards the particular selected character stream of markup language data 105, along with an identification of the markup language session (i.e., a session ID) to the character provider 140. The session switch event 125 may be the identity of a particular data communications session to which the character stream is associated and each session can have its own identity to allow the character processor to maintain state for each character processing session.

The character provider 140 provides individual characters from the character stream of markup language data 105 to the set of state machines 150. In one configuration, the character provider 140 provides multiple characters in one cycle to the set of state machines 150 within the character processor 120. This allows the set of state machines 150 to process multiple characters at a time (i.e., during a single cycle of state machines operation) for faster operation.

The set of state machines 150 generally operate as explained herein to convert the selected character stream of markup language data 105-1 through 105-N into corresponding intermediate representations 160-1 through 160-N, that each contain a set of encoded items (e.g., a set of TLVs) for each markup language session. Since there are N unique markup language sessions 105 in this example (i.e., N different incoming XML data streams), the character processor produces N unique intermediate representations containing respective sets of TLV encoded items 160-1 through 160-N, one for each distinct stream of markup language data 105-1 through 105-N. The character processor 120 outputs or provides the intermediate representations 160 to one or more subsequent processing mechanisms 180 for further processing.

Examples of the use of the character processor 120 and its TLV encoded item output within an XML processing device are disclosed in co-pending U.S. patent application Ser. No. 10/883,018. In addition, the subsequent processing mechanisms 180 can include, for example, an output generator capable of creating a linked tree data structure that can be utilized by a software application or other processing to access segments of XML within the entire input stream 105. Further still, the character processor can output the TLV/TLAs data for input into a filtering device, such as a hardware based programmable filter (e.g., XPATH filtering device). Details of post-processing operations that may be performed on the intermediate representation 160 are described in detail in the following co-pending patent applications Ser. Nos. 10/883,483 and 10/883,016.

The first application Ser. No. 10/883,483 above describes a system for creating trees from the intermediate representation 160, while the second application Ser. No. 10/883,016 describes a system to receive the intermediate representation and perform filtering operations on the TLV/TLA intermediate representation data 160 from a filter expression such as an XPATH expression.

The set of state machines 150 also receive the session switch event 125 and in response (as will be explained further), are able to create and maintain respective session states 170 corresponding to each distinct markup language session 105-1 through 105-N. Accordingly, in this example configuration, upon the occurrence of the session switch event 125, the character processor 120 can save the state of the set of state machines 150 within the corresponding session states 170 for the current markup language session and can load a previously saved session state 170 for a former session previously processed but that did not complete. The character processor 120 is able to load and store session states 170 as each markup language session is established and as each is switched via the session switch detector 130. This multiple markup language session capability may be used to process XML data arriving in packets over different data communications connections and thus in this example, there can be N different states, one for each stream 105. In an alternative configuration, there can be multiple instances of sets of state machines 150 (two or more), and each can operate concurrently with the others to allow the character processor 120 to process multiple markup language streams 105 or session at the same time. Implementation of multiple sets of state machines 150 may depend on availability of processor power and real estate (if implemented within hardware).

In implementations where a set of state machines 150 is switched between streams 105, during operation, the character processor 120 can identify a session switch event 125 indicating that sequences of characters of a second character stream (e.g., 105-2) associated with a second respective markup processing session are to be processed by the set of state machines 150. In response, whatever current construct state machine that is active processing a sequence of characters for the first character stream (e.g., 105-1) can produce a partial encoded item within the intermediate representation (i.e., 160-1 for stream 105-1) associated with a type of construct being processing within the current state machine, such that the intermediate representation 160-1 of the markup language constructs associated with the first character stream 105-1 indicates a transition of processing of the first markup processing session to the second markup processing session by the set of state machines 150. In other words, if a session switch occurs during processing of a construct, embodiments of the invention provide the ability to produce a partial TLV encoded item in the intermediate representation 160 that indicates that the construct that was being processed at the time of the session switch is not complete (i.e., there are more characters for this construct to be received when this stream resumes).

Figure 2:
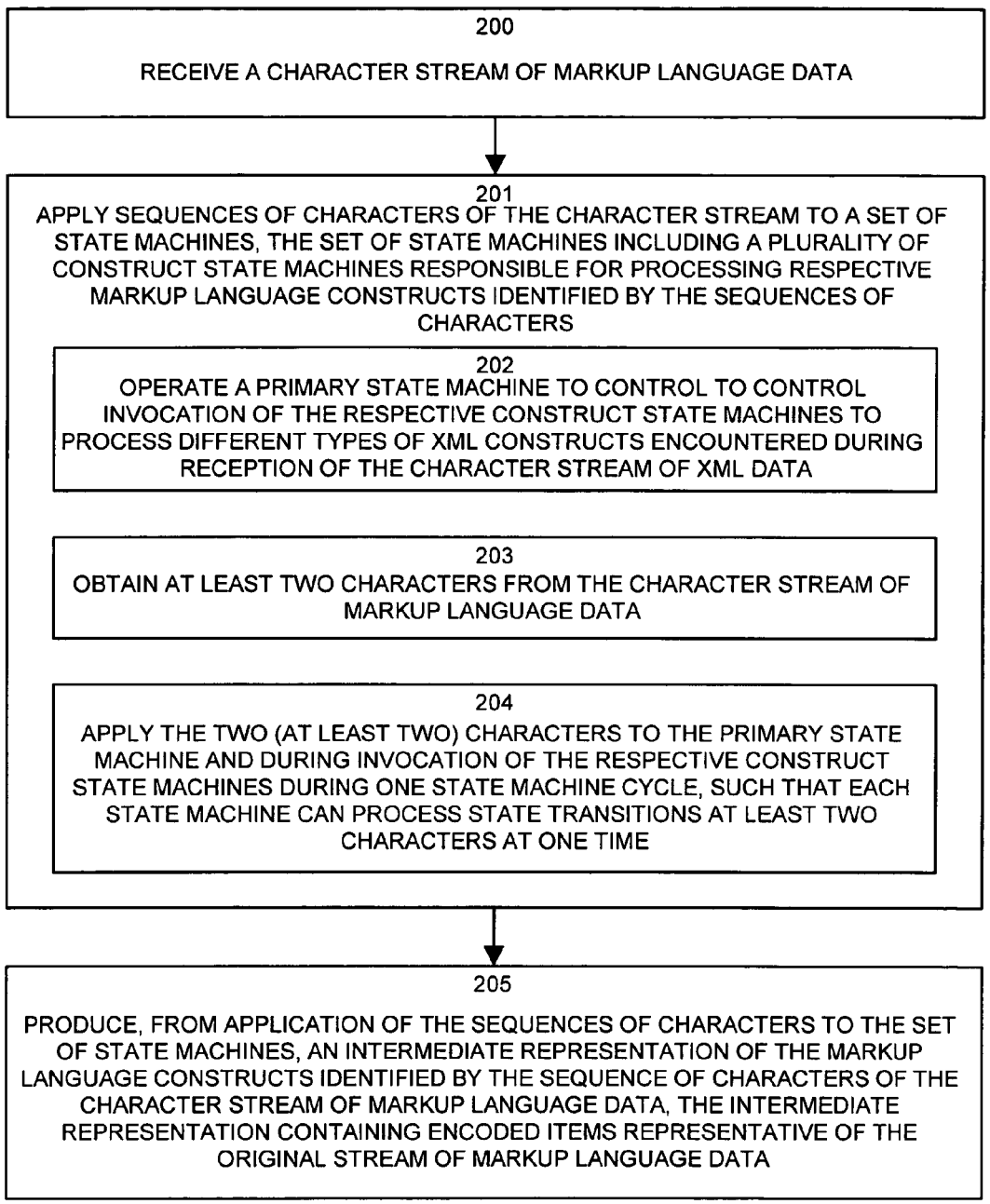
FIG. 2 is a flow chart of processing steps that show operation of a character processor configured to process a stream of markup language data in accordance with embodiments of the invention.

FIG. 2 is a flowchart of processing steps that a character processor 120 configured in accordance with one example embodiment of the invention performs to process character streams of markup language data in one configuration.

In step 200, the character processor 120 receives a character stream of markup language data 105. As an example, the markup language data may be formatted according to an extensible markup language (XML) specification such as XML version 1.0. Upon initial reception of a character stream of markup language data 105, the character processor 120 initializes the set of state machines 150 to a beginning state and the set of state machines creates a new session state 170 corresponding to this markup language session 105 (e.g., state 170-1 for session 105-1).

Next, in step 201, while the character processor 120 continually receives the character stream of markup language data 105, the character processor 120 applies sequences of characters 145 (from the character provider 140) of the character stream 105 to the set of state machines 150. The set of state machines 150 includes a plurality of construct state machines responsible for processing respective markup language constructs identified by the sequences of characters 105. Using XML as an example, the plurality of construct state machines can include specific state machines to process different types of XML constructs. An example standard XML specification defines eight distinct markup constructs (e.g., declarations) and one common text construct. Each of these markup constructs has a specific set of grammatical and "well formedness" rules. Some of these rules are common across markup definitions while others are unique to a specific markup definition or construct. Embodiments of the invention provide state machines to recognize these constructs and to produce TLV encoded item output when they appear in the markup language character stream 105.

Figure 3:
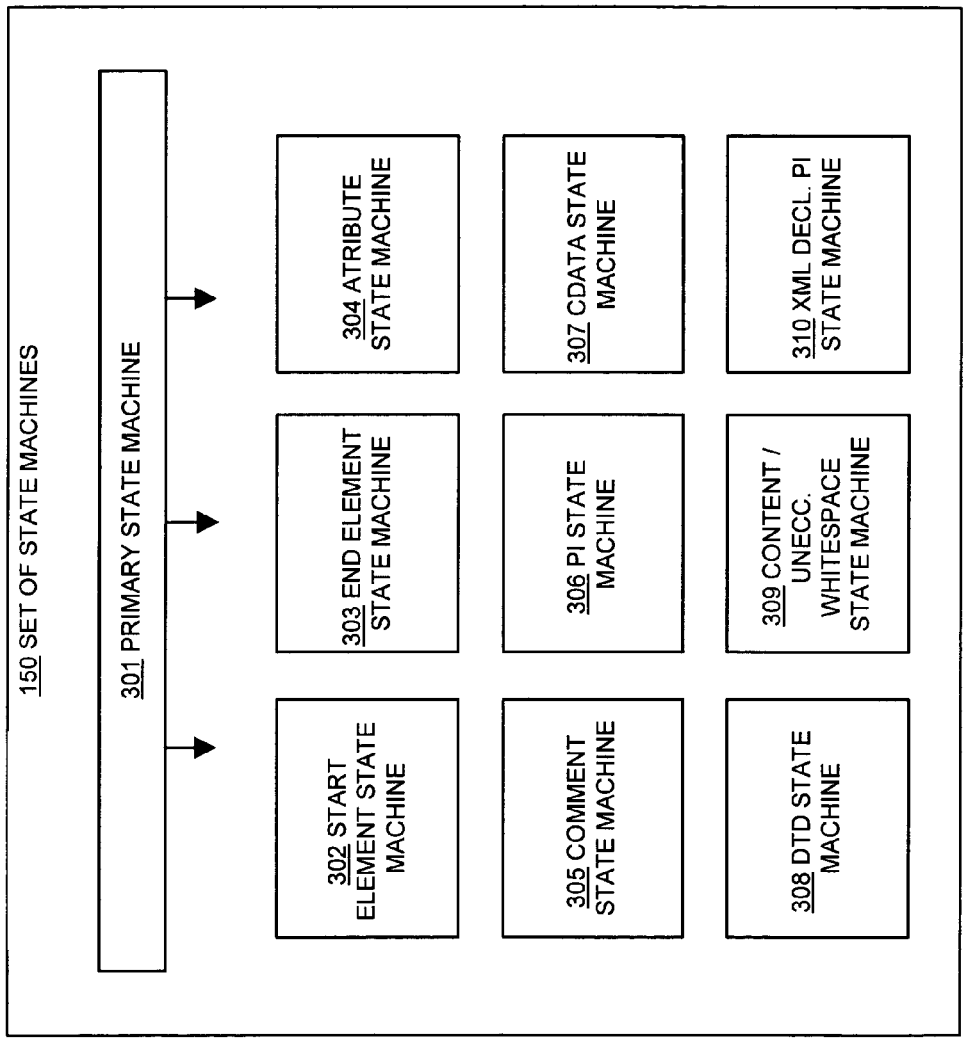
FIG. 3 illustrates primary and construct specific state machines within the set of state machines configured within in a character processor in accordance with one embodiment of the invention.

Directing attention briefly to FIG. 3, this figure illustrates one example embodiment of the invention in which a primary state machine 301 invokes operation of several construct-specific state machines 302 through 310, including:

1. A start element state machine 302;
2. An end element state machine 303;
3. An attribute state machine 304;
4. A comment state machine 305;
5. A processing instruction (PI) state machine 306;
6. A CDATA state machine 307;
7. A document type definition (DTD) state machine 308; and
8. A Content/unnecessary white space state machine 309.
9. An XML Declaration PI State Machine 310.

Each of these state machines is shown in detail and will be explained further with reference to FIGS. 4 through 13, the state machines 301 through 310 can invoke each other, such that control can be transferred from once respective construct state machine to another, without control having to always return to the primary state machine 301. The specific operation of each of these state machines 301 through 310 will be explained in detail shortly.

Returning attention back to FIG. 2, as shown in sub-step 202, during application of the sequence of characters of the character stream 105 to set of state machines 150, the character processor 120 operates the primary state machine 301 to control invocation of the respective construct state machines 302 through 310 to process different types of XML constructs encountered during reception of the character stream of XML data 105.

During application of the sequences of characters of the character stream 105 to the set of state machines, the character processor is able to process, as the sequence of characters 145, multiple characters at one time via the set of state machines 150. Specifically, in sub-step 203, the character provider 140 obtains at least two characters 145 at one time from the character stream of markup language data 105. In one embodiment, the set of state machines can process two characters from the XML character stream at one time. Details of the architecture and operation of the character provider 140 will be explained later with reference to FIG. 15.

In step 204, the set of state machines 150 applies the two characters 145 during invocation of the respective construct state machines 302 through 309 (as well as during operation of the primary state machine 301) during one state machine cycle, such that each state machine 301 through 310 can process state transitions using at least two characters 145 at one time. Note that two characters do not always have to be selected from the character provider 140, and in some cases, a state machine may only reference one character provided from the character provider 140.

In step 205, during application of the set of state machines 150 to the character stream of markup language data 105, the character processor 120 produces an intermediate representation 160 of the markup language constructs identified by the sequence of characters 145 of the respective character stream of markup language data 105. The intermediate representation 160 contains encoded items (e.g., TLVs) representative of the original stream of markup language data 105. In one configuration, the intermediate representation 160 of the markup language constructs identified by the sequence of characters of the character stream of markup language data are encoded items containing type, length, value (TLV) representations of the XML constructs identified by application of the sequences of characters of the character stream to the set of state machines. The aforementioned example conversions of XML constructs to TLVs are examples of the intermediate representation 160 that a character processor 120 produces from an XML character stream. Note that embodiments of the invention are not limited to TLV encoding of XML data, and that other encoding schemes may be used to convey the content of the character stream 105.

Further specific details of processing performed by the character processor 120 to convert markup language data to encoded items using the set of state machines 150 will now be provided with respect to a sequence of state machine diagrams that show processing steps and operations occurring within the state machines.

Figure 4:
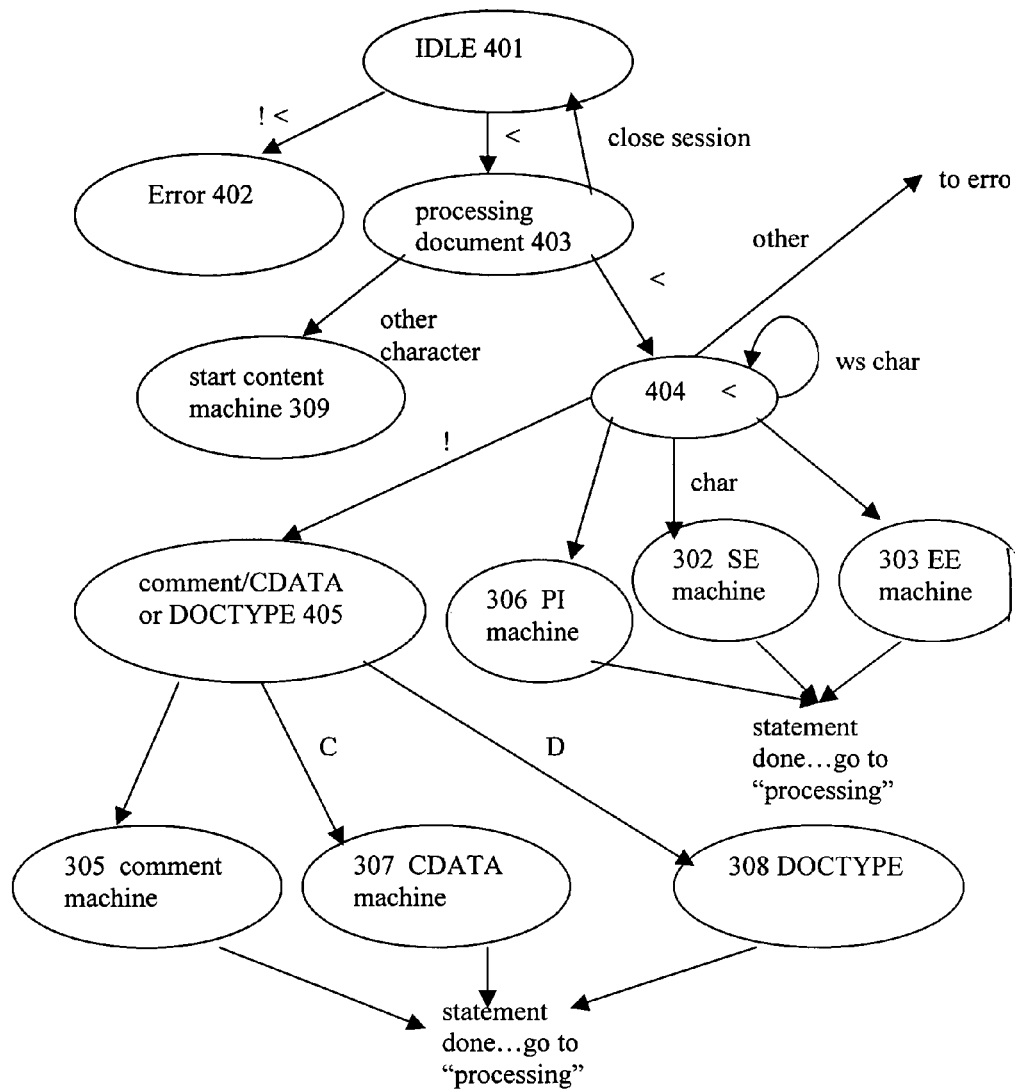
FIG. 4 is a state machine diagram for a primary state machine that operates to process XML markup language within a character processor configured in accordance with one embodiment the invention.

FIG. 4 is a state machine diagram of a primary state machine 301 provided within the set of state machines 150 within a character processor 120 configured in accordance with one example embodiment of the invention. Note for each state machine diagram explained in FIGS. 4 through 13, the primary operation of the state machine will be described in detail. From more detailed review of each particular state machine illustrated in the Figures however, it is noted that other processing operations within the state machine diagrams may exist that are not described here detail. As an example, each possible error condition will not be reviewed here in detail and several of state machines indicate character strings that will result in invalid character processing or error conditions. Likewise, there are several indications in the following state machine descriptions and Figures that indicate receipt of white space characters as the string "ws char" or simply "ws." The "ws" processing paths are frequently a looping state that simply traverses and eliminates or removes white space (spaces, tabs, etc.) encountered within the character stream 105. In addition, standard XML character strings that occur in sequence, such as "</" may be shown as transitions strings flowing between separate states and will not be reviewed in detail. Each possible path through each state machine need not be explained here in detail as those skilled in the art, from a review of the Figures, will readily be able to understand the flow of these diagrams. These minor processing paths within the state machines are shown for completeness and a reader skilled in the art can view the state machine within the figures for a description of each state transition or processing flow path within the various state machines.

Generally, as illustrated in FIG. 4, the primary state machine 301 is responsible for controlling the other construct-specific state machines 302 through 310. The primary state machine 301 reviews the XML character stream data 105 coming in from the character provider 140 and determines what type of XML construct needs to be processed. In response, the primary state machine 301 starts the appropriate construct specific state machines 302 through 310 as indicated in the state machine diagram in FIG. 4 and watches for the end of that construct to start the process all over again. Note that some state machines, such as the attribute state machine, are not started form the primary state machine, but rather are started from other state machines explained herein. Thus it is not required that the primary state machine initiate execution of all state machines and FIG. 4 is given by way of example only.

Figure 5:
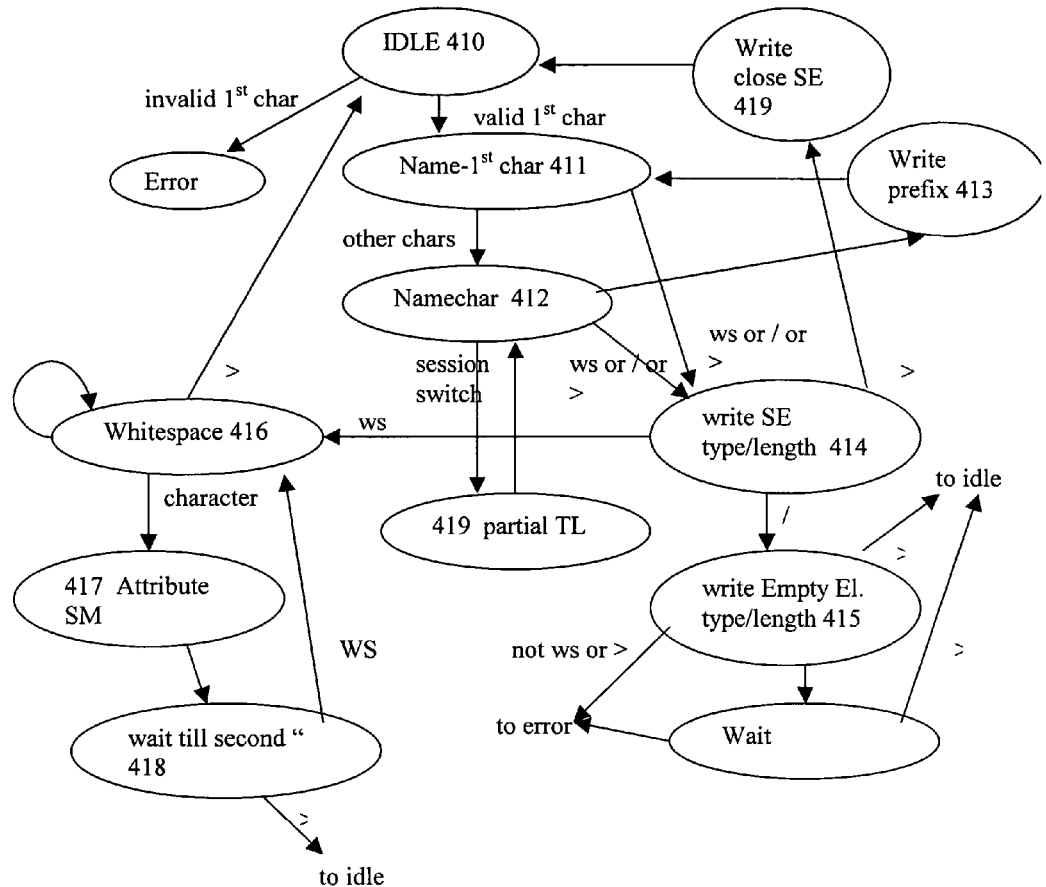
FIG. 5 is a state machine diagram for a start element state machine that operates to process XML markup language within a character processor configured in accordance with one embodiment the invention.
Figure 7:
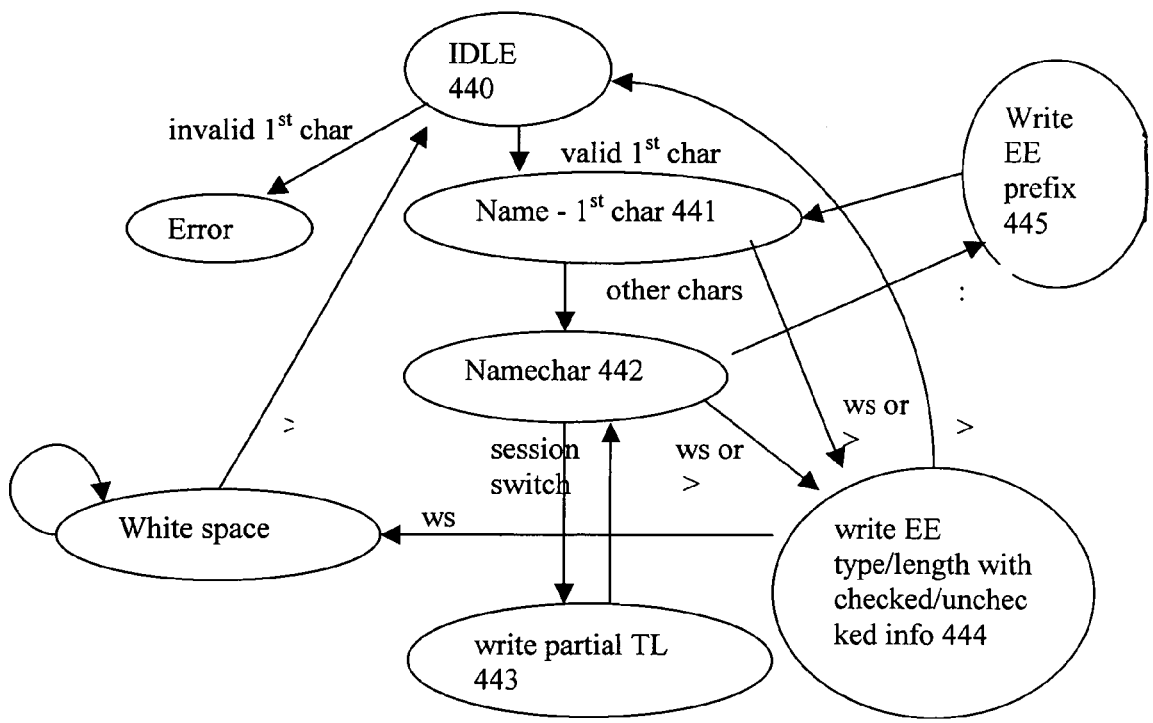
FIG. 7 is a state machine diagram for an end element state machine that operates to process XML markup language within a character processor configured in accordance with one embodiment the invention.

As show in FIG. 4, the primary state machine 301 begins in the primary idle state 401 and awaits receipt of an XML character data stream 105. While in the idle state 401, any string other than white space or "<" triggers entry into the error state 402. Alternatively, a character string of "<" causes entry into the document processing state 403. In the document processing state 403, receipt of a character string of any other character besides "<" causes entry into the content state machine 309 (described in FIG. 13). Alternatively, receipt of a "<" character followed by a "!" causes transition through intermediate state 404 to the comment state 305 (FIG. 8) for processing of an XML comment if a "-" is received (resulting in invocation of comment state machine 305 in FIG. 8), or for processing a CDATA construct if a "[" is received (resulting in invocation of the CDATA state machine 307 in FIG. 9) or for processing a DOCTYPE construct if a "D" is received (resulting in invocation of the document type state machine 308 in FIG. 10). Returning to the intermediate state 404, receipt of a "?" character causes invocation of the processing instruction state machine 306 (FIG. 11, or FIG. 12 if an XML declaration), or receipt of a "/" character causes invocation of the end element state machine 303 (FIG. 7). Still further, receipt of any other character besides white space causes invocation of the start element state machine 302 (FIG. 5). Each of the aforementioned state machines will now be described in detail.

FIG. 5 is a state machine diagram of a start element state machine 302 provided within the set of state machines 150 within a character processor 120 configured in accordance with one example embodiment of the invention. The character processor invokes the start element state machine during operation of the primary state machine upon detecting a sequence of characters representative of a start element. The character processor 120 operates the start element state machine to produce at least one start element encoded item containing type, length, value representations for at least one of a complete start element, a partial start element or an empty element within the XML character stream 105. A TLV representation of a complete start element would be all those TLVs required completely represent a sequence of characters representing an entire start element within an XML character stream 105. A sequence of TLVs representing a partial start element is produced by the character processor in state 419 in situations in which processing of a start element by the start element state machine 302 has commenced but then a session switch event 325 occurs causing entry into state 419 within the start element state machine 302. In such cases, a special partial TLV is written that indicates to the subsequent processing 180 that the XML character stream 105 had not completed and was interrupted by another session 105.

Generally, on the path through states 410 through 415, the start element state machine 302 checks the syntax of a name and breaks it into a prefix and suffix portions and writes TLVs 160 (states 413 and 414) for these portions. In addition, after the start element name is processed, the start element state machine 302 looks for attributes or namespace declarations on the path through states 416 through 418. If the start element state machine 302 identifies either one, the start element state machine 302 starts the attribute element state machine 304 (FIG. 6) (note that a namespace declaration is a special case of an attribute). A close start element TLV is written in state 419 after encountering a ">" in the character stream 105.

While operating the start element state machine 302 to produce at least one start element encoded item, the character processor 120 identifies prefix and suffix portions of the start element and in addition to producing respective encoded items for the prefix and suffix portions of the start element as explained above, the character processor stores representations of at least one of the prefix and suffix portions of the start element for comparison to at least one corresponding end element prefix and suffix portions that are later detected within at least one end element in the character stream of markup language data. The character processor 120 in one embodiment stores the start element prefix and suffix in registers (or in any other type of storage or memory location) in a start element data path section of the set of state machines 150 of the character processor. These registers are used for comparisons to end element prefixes and suffixes encountered later in the character stream for validation purposes. There are valid bits associated with these registers so that the character processor knows that an end element is compared properly.

Figure 6:
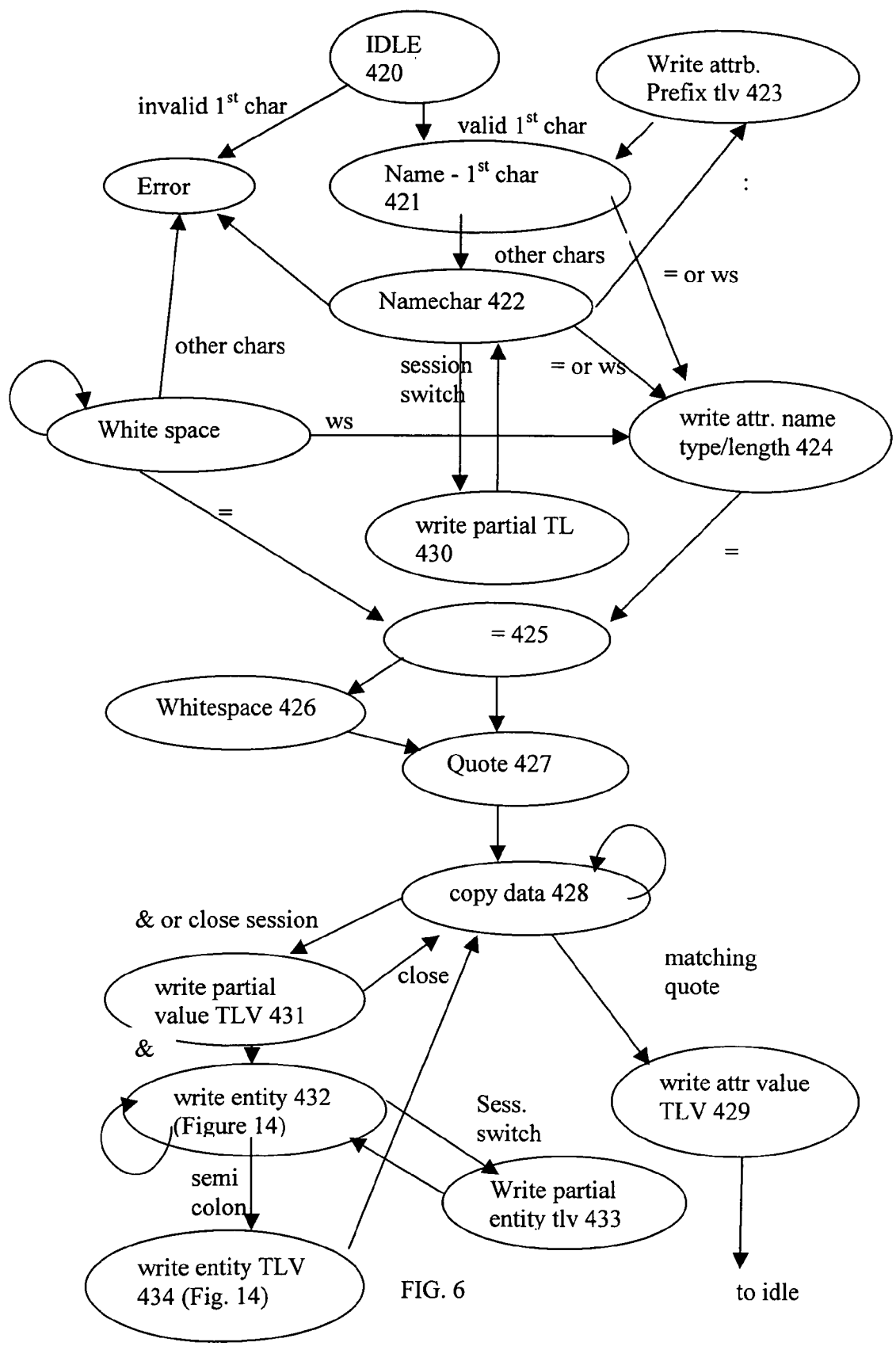
FIG. 6 is a state machine diagram for an attribute element state machine that operates to process XML markup language within a character processor configured in accordance with one embodiment the invention.

FIG. 6 is a state machine diagram of an attribute element state machine 304 provided within the set of state machines 150 within a character processor 120 configured in accordance with one example embodiment of the invention. The start element state machine 302 invokes operation of the attribute element state machine 304 upon identifying a sequence of characters representative of an attribute element within a start element. The character processor 120 operates the attribute element state machine 304 to perform the operation of parsing the attribute element into an attribute name prefix in states 420 through 424 and an attribute value suffix in states 425 through the 429 and produces an attribute name prefix encoded item (TLV) in state 423 for the attribute name prefix of the attribute element and produces an attribute value suffix encoded item (TLV) in states 428 and 429 for the attribute value suffix of the attribute element. As previously explained, in state 430 or states 431 through 434 (during writing of TLVs for an entity, as explained in FIG. 14), a session switch may occur causing the creation of a partial TLV to indicate that state machine processing existed during creation of attribute TLVs to process a different session.

Alternatively, the character processor 120 may identify that the attribute element is indicative of a namespace declaration and in response, invokes operation of a name space element state machine. This name space element state machine is identical to the attribute state machine except that the attribute name prefix is "xmlns" and this portion of character stream data is not written to the TLV buffer. In addition, or namespace declarations, the attribute and suffix is equivalent to the namespace prefix has a different type. Furthermore, if the namespace prefix is a default value, then the length within the TLV value is zero (0). In addition, for namespace content, the uniform resource identify should not have entities. Generally then, the namespace state machine parses a namespace prefix element from the namespace declaration and produces a namespace prefix encoded item or TLV and parses a uniform resource identifier from the namespace declaration and produces a uniform resource identifier encoded item identifying the value of the uniform resource identifier within the namespace declaration. That is, the namespace state machine parses a namespace declaration into its prefix and uniform resource identify (e.g., URL or URI). For a default name, it sends back a prefix of 0 length. This machine is started by the attribute state machine in one embodiment or, alternatively, is a separate state machine that can be invoked as needed.

FIG. 7 is a state machine diagram of an end element state machine 303 provided within the set of state machines 150 within a character processor 120 configured in accordance with one example embodiment of the invention. During operation of the primary state machine to control invocation of the respective construct state machines, if the character processor 120 detects a sequence of characters representative of an end element, the character processor 120 invokes an end element state machine 303 and operates the end element state machine 303 to produce at least one end element encoded item containing type, length, value representations for at least one of an end element or a partial end element. The end element state machine 303 in states 440 through 445 parses an XML end element into the prefix and suffix. Also, in state 444, the end element state machine 303 tells the character processor 120 to compare the name to the last start element name (e.g., saved in the register location noted above) if it is available and valid (as indicated by the checked/unchecked label in this state). In particular, operating the end element state machine to produce at least one end element encoded item comprises identifying a prefix and suffix portions of the end element and producing respective encoded items for the prefix and suffix portions of the end element in states and then comparing representations of at least one of the prefix and suffix portions of the end element to stored representations of at least one of a prefix and suffix portion of a start element previously detected in the character stream of markup language data for validation of the end element.

Figure 8:
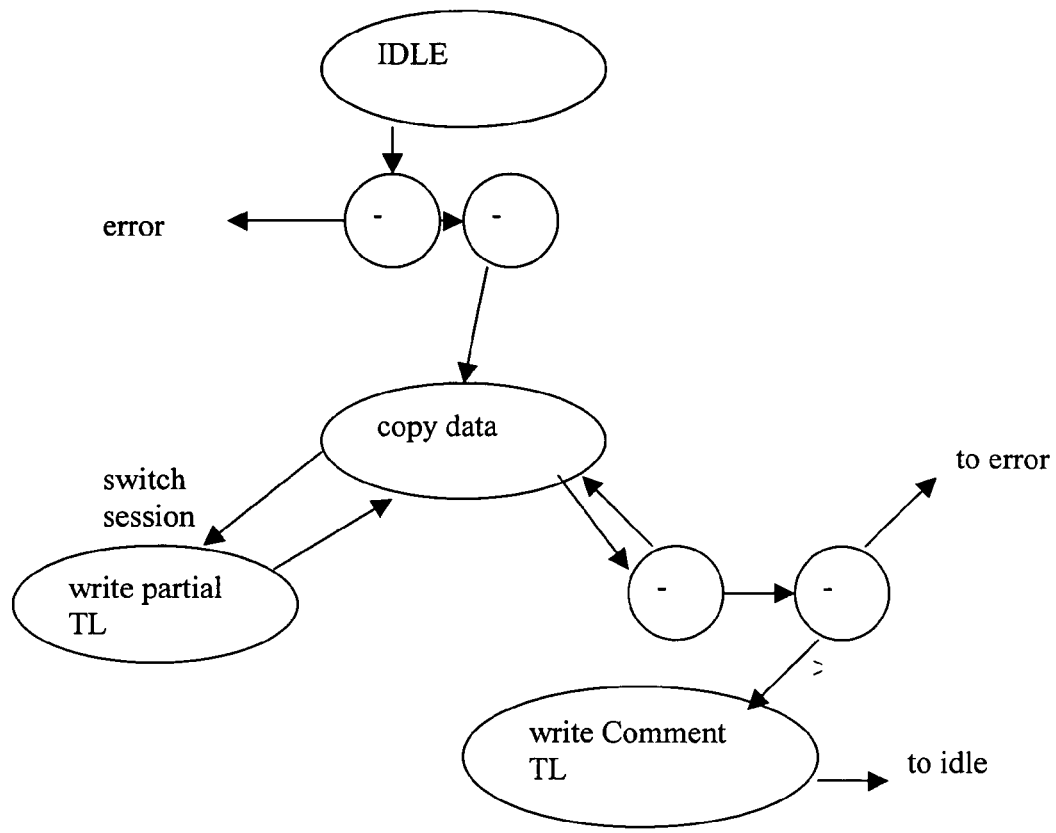
FIG. 8 is a state machine diagram for a comment data element state machine that operates to process XML markup language within a character processor configured in accordance with one embodiment the invention.

FIG. 8 is a state machine diagram of a comment data element state machine 305 provided within the set of state machines 150 within a character processor 120 configured in accordance with one example embodiment of the invention. Generally, the comment data element state machine 305 copies all data between the -- marks to the TLV output 160 and tracks the length of the comment. Any end-of-line characters will be normalized. As such, during operating the primary state machine 301 to control invocation of the respective construct state machines, if the character processor 120 detects a sequence of characters representative of a comment data element the character processor 120 invokes the comment data element state machine 305 and operates the comment data element state machine 305 to produce at least one comment data element encoded item 160 containing type, length, value representations for at least one of a comment data element or a partial comment data element. This states 450 through 453 accomplish this as illustrated. State 454 is the session switch condition resulting in the creation of the partial comment data element encoded item (i.e., a partial TLV indicating a session switch occurred during receipt of comment data).

Figure 9:
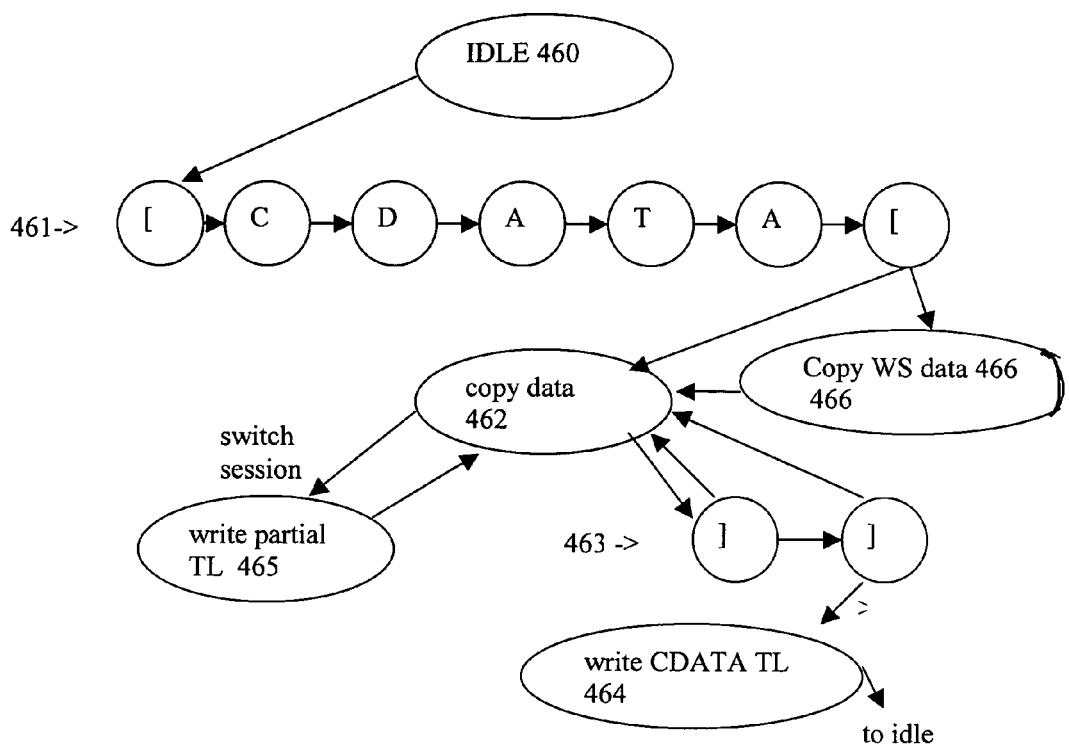
FIG. 9 is a state machine diagram for a CDATA element state machine that operates to process XML markup language within a character processor configured in accordance with one embodiment the invention.

FIG. 9 is a state machine diagram of a CDATA element state machine 307 provided within the set of state machines 150 within a character processor 120 configured in accordance with one example embodiment of the invention. Generally, the CDATA element state machine 307 copies the entire XML CDATA Section of the character stream 105 to the TLV output 160. In particular, when the character process 120 operates the primary state machine 301 in FIG. 5 to control invocation of the respective construct state machines and detects a sequence of characters representative of an XML CDATA construct, the primary state machine 301 invokes a CDATA element state machine 307 and operates the CDATA element state machine 307 to produce at least one CDATA element encoded item containing type, length, value representations for at least one of a character data element or a partial character data element. This is shown in states 460 through 464 in FIG. 9. Note that the reference numeral 461 refers to the sequence of state transitions for the "[CDATA[" string and reference 463 refers to the state transitions for the "]]" string. State 466 allows white space data to be copied or stripped, depending upon application of the character processor 120. State 465 is the session switch condition resulting in the creation of the partial CDATA element encoded item (i.e., a partial TLV indicating a session switch occurred during receipt of CDATA construct).

In this example embodiment, the CDATA element state machine 307 does no checking or normalization of data during the copy. In an alternative configuration, the CDATA element state machine 307 detects a non-normalization setting associated with the character stream of markup language data 105 to which the plurality of state machines 150 are applied and copies the character data element to the character data element encoded item using non-normalization processing. Alternatively, the character processor 120 can be configured with flags to indicate that CDATA statements (and the data they contain) are to be removed or transformed from the character stream 105. It is to be understood that the illustrated state machine is shown by way of example only, and special CDATA processing, such as data transformations, can be applied in other state machines and such processing is within the scope of embodiments of this invention.

Figure 10:
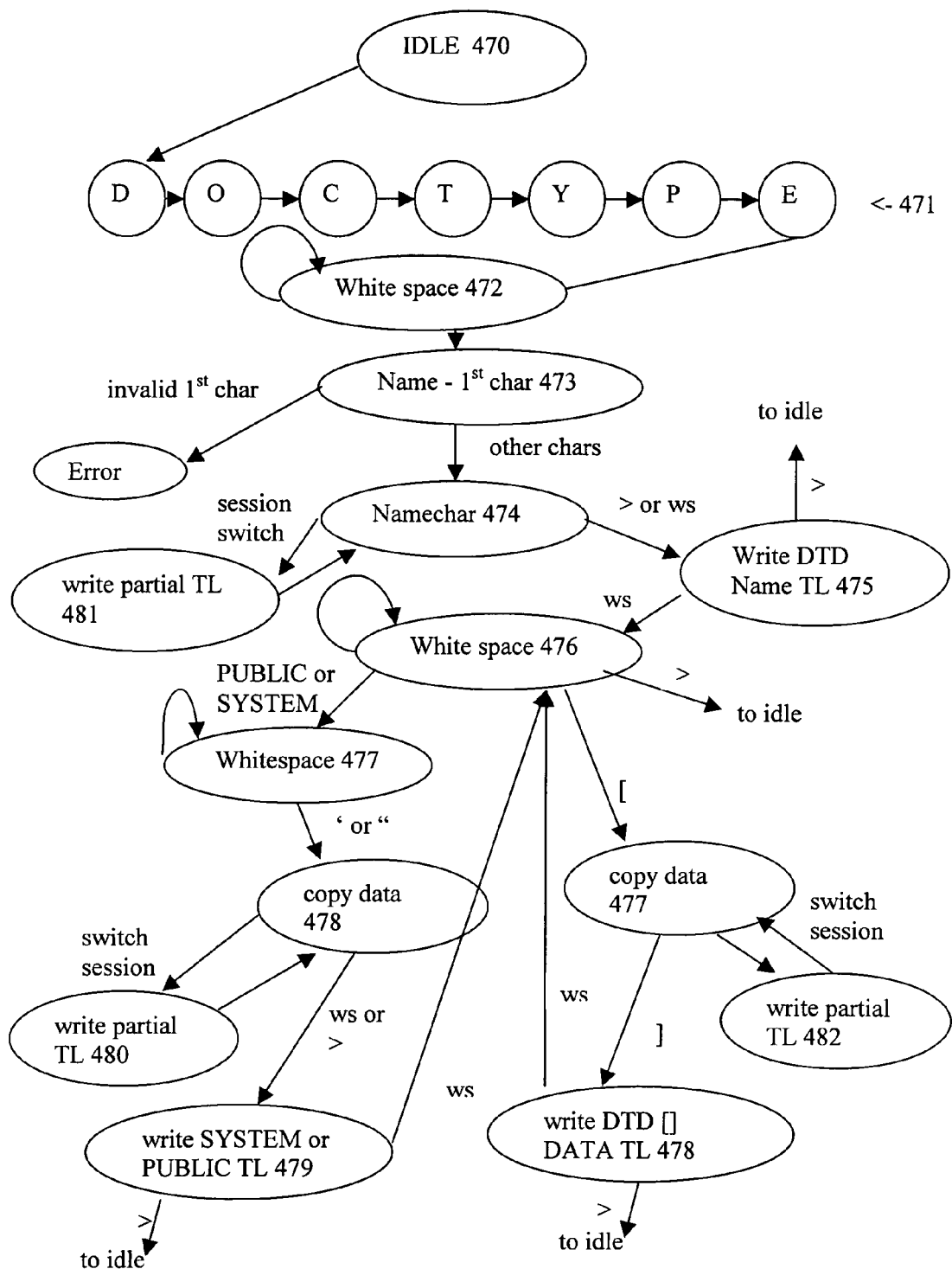
FIG. 10 is a state machine diagram for a document type definition state machine that operates to process XML markup language within a character processor configured in accordance with one embodiment the invention.

FIG. 10 is a state machine diagram of a document type definition (DOCTYPE) state machine 308 provided within the set of state machines 150 within a character processor 120 configured in accordance with one example embodiment of the invention. Generally, the DOCTYPE state machine 308 produces at least one document type definition element encoded item containing type, length, value representations for the document type definition encountered within the character stream of markup language data during operation of states 470 through 479. In addition, states 480, 481 and 482 cover the possible session switch conditions that result in the creation of the partial DOCTYPE element encoded item (i.e., a partial TLV indicating a session switch occurred during receipt of DOCTYPE construct).

FIG. 11 is a state machine diagram of a processing instruction (PI) state machine 306 provided within the set of state machines 150 within a character processor 120 configured in accordance with one example embodiment of the invention. The processing instruction state machine 306 parses XML PI statements into target and data portions. There is a special case of PI that handles the XML declaration statement and will be shown in FIG. 12 as an XML PI declaration state machine 310.

As the character processor 120 operates the primary state machine 301 and detects a sequence of characters representative of a processing instruction (XML PI) element, the processor 120 invokes the processing instruction element state machine 306. The character processor 120 operates the processing instruction element state machine 306 to produce at least one processing instruction data element encoded item 160 containing type, length, value representations for at least one of a processing instruction data element or a partial processing instruction data element. In particular, in states 490 through 496 the processing instruction state machine 306 produces a non-declaration processing instruction target data element (in state 493) and produces a non-declaration processing instruction value data element (state 496). In addition, states 497 and 498 are the session switch conditions states resulting in the creation of the partial PI element encoded item (i.e., a partial TLV indicating a session switch occurred during receipt of PI construct) if the XML stream is interrupted during receipt of a PI declaration.

FIG. 12 is a state machine diagram of an XML PI declaration state machine 310 provided within the set of state machines 150 within a character processor 120 configured in accordance with one example embodiment of the invention. In this state machine 310, the processing instruction is an XML declaration processing instruction and the XML PI declaration state machine 310 identifies one or more of the version, encoding and standalone constructs as shown within the XML declaration processing instruction and copies the version, encoding and standalone constructs within the XML declaration processing instruction into encoded item output 160. Note that after seeing the string "xml", the state machine 310 can transition to either the version 501, encoding 502, or standalone 503 states, and after processing the sequence of state transitions below that state (below 501, 502 or 503), processing can return to the next state in the sequence of 502 or 503. Note that the order of states 501, 502 and 503 is determined by the XML standard, but each is not required. Thus there may only be, for example, encoding 502 and standalone 503 states used during stream processing, and version 501 need not be present. Note that each of the individual states are not enumerated in this example as the diagram is self explanatory. Also note that at any time during processing of states in FIG. 12, state 504 may be entered to handle change of the markup language session to a new or different session and a partial TLV is written.

FIG. 13 is a state machine diagram of an content state machine 309 provided within the set of state machines 150 within a character processor 120 configured in accordance with one example embodiment of the invention. The content state machine 309 generally copies all data between markups. As the character processor 120 operates the primary state machine 301 to control invocation of the respective construct state machines, if the character processor 120 detects a sequence of characters representative of a content declaration within the character stream of markup language data, the character processor 120 invokes the content state machine 309 and operates the content state machine 309 to produce, in states 511 through 520, at least one content element encoded item containing type, length, value representations for the content declaration encountered within the character stream of markup language data. In states 513 and 514, if the data is all white spaces, this state machine 309 will flag "unnecessary white space" by writing a TLV indicating such, and thus this state machine can identify and eliminate unnecessary white space within the character stream of markup language data 105 and in response, produces an unnecessary white space encoded item within encoded item output 160. In states 517 and 518, the content state machine references the entity state machine in FIG. 14 for creation and writing of TLVs for an entity (as explained in FIG. 14). This state machine 309 can also perform normalization processing in state 521 on the sequence of characters to perform removal of end-of-line and line feed characters within the character stream of markup language data.

FIG. 14 is a state machine diagram of an entity state machine 311 provided within the set of state machines 150 within a character processor 120 configured in accordance with one example embodiment of the invention. The entity state machine 311 produces entity TLV data 160 when called from the attribute state machine (FIG. 6) or the content state machine (FIG. 13). As the character processor 120 operates the primary state machine 301 to control invocation of the respective construct state machines, if the character processor 120 detects a sequence of characters representative of an entity while in the attribute state machine or the content state machine, states 531 through 539 of the entity state machine 311 create TLV data for the entities.

FIG. 15 is an example of architecture of the character provider 140 configured in accordance with one example embodiment of the invention. In FIG. 15, the character provider 140 includes an address register 101 having an ADVANCE input 106, a random access memory 102 for storing the input character stream, and a set of registers 104-1 through 104-3 that are able to maintain individual respective character of the character stream of markup language data 105. A decoder 103 has inputs 111-1 through 111-3 to indicate what characters in the registers 104 are presently valid. The state machines 150 control the ADVANCE signal to indicate the need for more characters to process. By reading the valid bits 111, the state machine can determine if two characters are available from RAM 102 for application to the set of state machines 150. In this manner, two characters can be accessed at once by the set of state machines 150 allowing for faster state machine operation. In addition, this architecture of the character provider 140 solves data alignment problems. The number of characters used in a given cycle is dependent, in this example embodiment, on two factors—the alignment of data and where the character provider 140 is in the XML data stream. XML data input typically is read from a memory that is 8 bytes wide; however, the input data may start on any given byte in that 8 byte word. Valid bits are used to determine which if any of the bytes has valid data. Depending on the state of the valid bits, the character provider 140 will either skip the current two bytes (in the case where neither is valid), look at one byte (in the case that only one is valid) or look at both bytes (in the case that two are valid) For example:

Suppose the data <ABC> starts at byte offset 1 of the 8 byte word in memory. When loaded into the character provider structure 140 without data rotation we would have:

| RAM DATA - BYTE 1 | RAM DATA - BYTE 2 | VALID BITS |
|---|---|---|
| ? | < | One valid |
| A | B | Two valid |
| C | > | Two valid |
| ? | ? | None valid |

This data would get presented to the character processor state machines from the character provider 140 as follows:

Cycle 1: One valid, single character=<

Cycle 2: Two Valid, First character=A, second Character=B

Cycle 3: Two valid; First character=C, second character=>

Cycle 4: None Valid

If the data started in memory at offset 0, the RAM data would look like:

| RAM DATA - BYTE 1 | RAM DATA - BYTE 2 | VALID BITS |
|---|---|---|
| < | A | Two Valid |
| B | C | Two Valid |
| > | ? | One Valid |
| ? | ? | None valid |

This data would get presented to the parser state machines as follows:

Cycle 1: Two valid, First character=<, second character=A

Cycle 2: Two Valid, First character=B, second Character=C

Cycle 3: One valid; single character=>

Cycle 4: None Valid

By using the valid bits and the three different character registers, embodiments of the invention can avoid having to rotate data into a well-known position once it is read from memory. This concept can easily be extended beyond two bytes and embodiments of the invention are intended to include such implementations.

In addition to handling of misaligned data, there are times when a given state machine only needs to process certain bytes of the input data. For example, with the start tag <ABC>, the master or primary state machine sees <A so it will invoke the start element machine. The Start element machine only "cares about" (i.e., needs to process) A and not the <, which presents a problem stated as "how does the master or primary state machine tell the start element state machine where to start the analysis? Similarly, what if the primary encounters < in one cycle and AB in the next?

One aspect of embodiments of the invention that makes this possible is the ability for each state machine to advance the characters either one or two at a time. This advance mechanism is controlled in this example embodiment (in FIG. 15) by two lines—"ADVANCE" which instructs ram control circuitry to load the next two characters into the data registers, and "VALID_PTR" which is conceptually an advance by one character. In one configuration, it loads the "SECOND CHARACTER" into the "SINGLE CHAR" register and manipulates the valid signals so it looks like only one is valid. No data is unloaded from the RAM in this example implementation because doing such might require data rotators which are expensive in both space and time.

The following examples show how the state machines utilize these signals to leave the RAM data in a state that is ready for the next machine to immediately process.

Example 3

<ABC> at Offset 0

| RAM DATA - BYTE 1 | RAM DATA - BYTE 2 | VALID BITS |
|---|---|---|
| < | A | Two valid |
| B | C | Two Valid |
| > | < | Two Valid |
| — | — | Two Valid |

This data would get presented to the parser state machines as follows:
- Cycle 1: Master (i.e., primary) machine sees <A. It starts the start element machine, but does not advance the characters. Instead is sets VALID_PTR which loads the A into "single char" and changes the "valid bits" to one valid.
- Cycle 2: start element sees 1 character valid—A and advances the data.
- Cycle 3: start element sees 2 characters valid—BC and advances the characters
- Cycle 4: start element machines sees two characters valid ><. It determines it is done and returns control to the master after setting "VALID_PTR" so that < is loaded into the Single char. Register.

Example 4

<ABC> at Offset 1

| RAM DATA - BYTE 1 | RAM DATA - BYTE 2 | VALID BITS |
|---|---|---|
| ? | < | One valid |
| A | B | Two Valid |
| C | > | Two valid |
| ? | ? | None valid |

This data would get presented to the parser state machines as follows:
- Cycle 1: Master/Primary machine sees < and advances the characters
- Cycle 2: Master sees AB, determines this is a start tag and kicks off the start element (SE) state machine. The characters are NOT advanced.
- Cycle 3: The SE state machine sees two characters valid, AB, and advances the character.
- Cycle 4: SE machines sees C>, determines it is done and returns control to the master after advancing the characters Note that the character provider 140 can keep track of how many characters are processed on a single cycle, thus keeping track of per-cycle character counts. This information might be useful to track for access by a software implementation.

Those skilled in the art will understand that there can be many variations made to the embodiments explained above while still achieving the same objective of those embodiments and the invention in general.

As an example, a state machine responsible for handling common groups of states found in several of the aforementioned state machines could be used to reduce the overall size of the aforementioned state machines. As an example, a state machine such as a name copy state machine which is responsible for handling "XML names" can be provided that provide the name copy processing explained above in the PI, Attribute, DOCTYPE, Start element and/or end element state machines. Such a name copy state machine provides the same group of states for handling names as each of these earlier described state machines to avoid recreating that logic in every state machine. In other words, one optimization is to provide one name copy state machine that handles all names and each of the above listed state machines (e.g., PI, Attribute, DOCTYPE, Start element and/or end element state machines) calls that name copy state machine.

As another example, it is to understood that embodiments of the invention are not limited to processing XML markup language streams, but are applicable to any type of markup language or text-based data format being converted to encoded item format. In addition, preferred embodiments of the invention are implemented in hardware as a set of gates programmed into a microcontroller such as a Field Programmable Gate Array (FPGA) or equivalent device. In such an embodiment, a developer of a system including an embodiment of the invention embeds the method for processing markup language data as a series of logic instructions within a dedicated programmable microcontroller in hardware (as opposed to providing such instructions as software code that executes on a general purposes central processing unit). The programmable microcontroller may be a FPGA microchip that includes an input interface (e.g., a data bus or input pins into the chip) for receiving the character stream of markup language data and an output interface (e.g., an output bus, or set of pins, that may be the same as the input interface pins) for producing the intermediate representation. The microcontroller can thus embody the character processor 120 (or the character processor 120 can be a portion of the logic embedded within the microcontroller) and can be included in the computerized device 110, that may be a dedicated markup language processing device. In operation, the programmable microcontroller operates in hardware to process the character stream of markup language data such that all processing of the character stream of markup language data is done in hardware and such that software processing of the character stream of markup language data is not required by a general-purpose central processing unit (e.g., a CPU in a computer that loads and executes software programs).

Thus a hardware based embodiment provides a character processor device comprising an input interface for receiving a character stream of markup language data and logic processing (e.g., pre-programmed FPGA gates) coupled to the input interface and configured to receive and apply sequences of characters of the character stream to the set of state machines that are also encoded within the logic processing. The logic processing produces, from an output interface coupled to the logic processing, the intermediate representation of the markup language constructs identified by the sequence of characters of the character stream of markup language data. In other words, one embodiment provides the system of the invention as a dedicated embedded hardware device for speed of processing of conversion of markup language data such as XML to encoded items such as TLV data.

Additionally, it is to be understood that the term "intermediate" representation of markup language data need not imply that the TLV output data be usable in the form produced by the character processor. That is, the term intermediate is intended to indicate that the representation of TLV or TLA data produced by the character processor 120 is different than the original XML input data. It is thus to be understood that the intermediate representation containing encoded items can be directly used for various processing operations in its output form. As an example, the character processor 120 can transfer the intermediate representation containing encoded items directly transmitted to a back-end server for use therein.

As another alternative configuration, a computerized device 110 can be configured with multiple character processors 120 that operate independently and thus multiple XML input streams 105 can be processed in parallel. As another alternative, a single input session 105 can be applied to multiple character processors 120 at the same time, such that the session 105 is split between the multiple character processors 120 to achieve higher overall throughput. Other variations on a hardware implementation of the character processor 120 include the use of reconfigurable chips to allow for upgrades due to XML standard changes. As an example, a chip that implements the character processor can be remotely programmable to allow for reprogramming it on boot-up of the computerized device 110 in the event new constructs are implemented with future versions of a markup language. Additionally, a character processor 120 of this invention can be configured with a set of state machines that are optimized for a certain type, version of release of XML data (or any markup language) to be processed. Thus, one set of state machines can be optimized for a certain version of XML, while another set can be optimized for another version. The character processor 120 can be re-programmable to allow different sets of state machines to be downloaded and operated as explained herein depending upon what version of a markup language is in use or expected in the input streams 105. In one configuration, parallel character processors can be configured with the same or different versions of the set of state machines 150 to allow "parallel processing" of incoming XML data/sessions 105.

Thus, in one embodiment, the character processor includes a means for selecting a set of state machines from a plurality of sets of state machines, each set optimized for processing a specific type of markup language data, such as an operator input that indicates what version of XML is being processed. Alternatively, this means can be dynamic detection of the XML version as the data 105 is streaming through the character processor 120. In response, the character processor 120 can include a means for programming the character processor device with the selected set of state machines to optimally perform the processing operations of operations of receiving the character stream of markup language data, applying the sequences of characters of the character stream of the second markup processing session to a set of state machines, and producing an intermediate representation based on the specific type of markup language data for which the selected set of state machines is selected. This means can be a set of state machines for each version of XML (e.g., 150-1, 150-2 and so forth, one for each version of XML), and when the operator selects what version is to be processed, the character processor can be re-programmed with the appropriate set of state machines optimized for that XML version.

Accordingly, embodiments of the invention are not intended to be limiting to the aforementioned discussion, but rather, equivalents and variations now apparent to those skilled in the art from reading this disclosure of the aforementioned processing steps are intended to be included as embodiments of the invention as well.

What is claimed is:

1. A method for processing extensible markup language (XML) data, the method comprising:

receiving a character stream of markup language data;

applying sequences of characters of the character stream to a set of state machines, the set of state machines including a plurality of construct state machines responsible for processing respective XML constructs identified by the sequences of characters;

operating a character provider in a character processor to provide characters from the character stream to the set of state machines;

operating a primary state machine to control to control invocation of the respective construct state machines to process different types of XML constructs encountered during reception of the character stream of XML data; and producing, from application of the sequences of characters to the set of state machines, an intermediate representation of the markup language constructs identified by the sequence of characters of the character stream of markup language data, the intermediate representation having encoded items including type, length, value representations of the XML constructs and representative of the original stream of XML data.

2. The method of claim 1 wherein operating a primary state machine to control invocation of the respective construct state machines comprises:

detecting a sequence of characters representative of a start element and invoking a start element state machine; and operating the start element state machine to produce at least one start element encoded item containing type, length, value representations for at least one of:

a complete start element;

a partial start element; and an empty element.

3. The method of claim 2 wherein operating the start element state machine comprises:

identifying a sequence of character representative of an attribute element within a start element and in response, invoking an attribute element state machine; and operating the attribute element state machine to perform at least one of:

i) parsing the attribute element into an attribute name prefix and an attribute value suffix and producing an attribute name prefix encoded item for the attribute name prefix of the attribute element and producing an attribute value suffix encoded item for the attribute value suffix of the attribute element; and ii) identifying that the attribute element is indicative of an namespace declaration and in response, invoking operation of a name space element state machine.

4. The method of claim 1 wherein operating a primary state machine to control invocation of the respective construct state machines comprises:

detecting a sequence of characters representative of a processing instruction element and invoking a processing instruction element state machine; and operating the processing instruction element state machine to produce at least one processing instruction data element encoded item containing type, length, value representations for at least one of:

a processing instruction data element;

a partial processing instruction data element.

5. The method of claim 4 wherein the processing instruction is a non-declaration processing instruction and wherein operating the processing instruction element state machine to produce at least one processing instruction data element encoded item comprises:

producing a non-declaration processing instruction target data element; and producing a non-declaration processing instruction value data element.

6. The method of claim 4 wherein the processing instruction is an XML declaration processing instruction and wherein operating the processing instruction element state machine to produce at least one processing instruction data element encoded item comprises:

identifying at least one of encoding and standalone constructs within the XML declaration processing instruction and copying the version, encoding and standalone constructs within the XML declaration processing instruction into encoded item output.

7. The method of claim 1 wherein applying sequences of characters of the character stream to a set of state machines comprises:

obtaining at least two characters from the character stream of markup language data; and applying the at least two characters to the primary state machine and during invocation of the respective construct state machines during one state machine cycle, such that each state machine can process state transitions at least two characters at one time.

8. The method of claim 1 wherein the state machines of the plurality of state machines can invoke each other, such that control can be transferred from once respective construct state machine to another, without control returning to the primary state machine.

9. The method of claim 1 wherein the character stream of markup language data is associated with a respective markup processing session, and wherein there are a plurality of respective markup processing sessions, each having an associated character stream of markup language data, and wherein the method comprises:

during application of sequences of characters of a first character stream associated with a first markup processing session to the set of state machines, identifying a session switch event indicating that sequences of characters of a second character stream associated with a second respective markup processing session is to be processed by the set of state machines;

saving the state of the first markup processing session for the first character stream in a first session state;

determining if a second session state exists that is associated with the second markup processing session, and if so, loading the second session state for use by the set of state machines; and performing, for sequences of characters of a character stream of the second markup processing session, the operations of receiving the character stream of markup language data, applying the sequences of characters of the character stream of the second markup processing session to a set of state machines, and producing an intermediate representation of the markup language constructs identified by the sequence of characters of the second character stream of markup language data.

10. The method of claim 1 comprising:

embedding the method for processing markup language data as a series of logic instructions within a programmable microcontroller in hardware, the programmable microcontroller including an input interface for receiving the character stream of markup language data and an output interface for producing the intermediate representation; and operating the programmable microcontroller in hardware to process the character stream of markup language data such that all processing of the character stream of markup language data is done in hardware and such that software processing of the character stream of markup language data is not required by a general purpose central processing unit.

11. The method of claim 1 wherein operating a primary state machine to control invocation of the respective construct state machines comprises:

invoking a content state machine and operating the content state machine to produce an unnecessary white space encoded item within encoded item output.

12. The method of claim 1 wherein the character stream of markup language data is applied to multiple character processors at the same time, such that the character stream is split between the multiple character processors to achieve higher overall throughput.

13. A character processor device comprising:

an input interface for receiving a character stream of extensible markup language (XML) data;

logic processing coupled to the input interface and configured to receive and apply sequences of characters of the character stream to a set of state machines encoded within the logic processing, the set of state machines including a plurality of construct state machines responsible for processing respective XML constructs identified by the sequences of characters;

the logic processing operating a primary state machine to control to control invocation of the respective construct state machines to process different types of XML constructs encountered during reception of the character stream of XML data;

the logic processing operating a character provider in a character processor to provide characters from the character stream to the set of state machines; and the logic processing producing, from an output interface coupled to the logic processing, from application of the sequences of characters to the set of state machines, an intermediate representation of the markup language constructs identified by the sequence of characters of the character stream of XML language including data type, length, value representations of the XML constructs, the intermediate representation containing encoded items representative of the original stream of markup language data.

14. The character processor device of claim 13 wherein when the logic processing performs the operation of operating a primary state machine to control invocation of the respective construct state machines the logic processing performs the operations of:

detecting a sequence of characters representative of a start element and invoking a start element state machine; and operating the start element state machine to produce at least one start element encoded item containing type, length, value representations for at least one of:

a complete start element;

a partial start element;

an empty element.

15. The character processor device of claim 14 wherein operating the start element state machine comprises:

identifying a sequence of character representative of an attribute element within a start element and in response, invoking an attribute element state machine; and operating the attribute element state machine to perform at least one of:

i) parsing the attribute element into an attribute name prefix and an attribute value suffix and producing an attribute name prefix encoded item for the attribute name prefix of the attribute element and producing an attribute value suffix encoded item for the attribute value suffix of the attribute element; and ii) identifying that the attribute element is indicative of an namespace declaration and in response, invoking operation of a name space element state machine.

16. The character processor device of claim 15 wherein invoking operation of a name space element state machine comprises:

parsing a namespace prefix element from the namespace declaration and producing a namespace prefix encoded item; and parsing a uniform resource identifier from the namespace declaration and producing a uniform resource identifier encoded item identifying the value of the uniform resource identifier within the namespace declaration.

17. The character processor device of claim 14 wherein operating the start element state machine to produce at least one start element encoded item comprises:

identifying a prefix and suffix portions of the start element; and producing respective encoded items for the prefix and suffix portions of the start element; and storing representations of at least one of the prefix and suffix portions of the start element for comparison to at least one corresponding end element prefix and suffix portions that are later detected within at least one end element in the character stream of markup language data.

18. The character processor device of claim 13 wherein operating a primary state machine to control invocation of the respective construct state machines comprises:

detecting a sequence of characters representative of a processing instruction element and invoking a processing instruction element state machine; and operating the processing instruction element state machine to produce at least one processing instruction data element encoded item containing type, length, value representations for at least one of:

a processing instruction data element;

a partial processing instruction data element.

19. The character processor device of claim 18 wherein the processing instruction is a non-declaration processing instruction and wherein operating the processing instruction element state machine to produce at least one processing instruction data element encoded item comprises:

producing a non-declaration processing instruction target data element; and producing a non-declaration processing instruction value data element.

20. The character processor device of claim 18 wherein the processing instruction is an XML declaration processing instruction and wherein operating the processing instruction element state machine to produce at least one processing instruction data element encoded item comprises:

identifying at least one of version, encoding and standalone constructs within the XML declaration processing instruction and copying the version, encoding and standalone constructs within the XML declaration processing instruction into encoded item output.

21. The character processor device of claim 13 wherein applying sequences of characters of the character stream to a set of state machines comprises:

obtaining at least two characters from the character stream of markup language data; and applying the at least two characters to the primary state machine and during invocation of the respective construct state machines during one state machine cycle, such that each state machine can process state transitions at least two characters at one time.

22. The character processor device of claim 13 wherein the state machines of the plurality of state machines can invoke each other, such that control can be transferred from once respective construct state machine to another, without control returning to the primary state machine.

23. The character processor device of claim 13 wherein the character stream of markup language data is associated with a respective markup processing session, and wherein there are a plurality of respective markup processing sessions, each having an associated character stream of markup language data, and wherein the method comprises:

during application of sequences of characters of a first character stream associated with a first markup processing session to the set of state machines, identifying a session switch event indicating that sequences of characters of a second character stream associated with a second respective markup processing session is to be processed by the set of state machines wherein identifying a session switch event comprises within a current state machine that is processing the sequence of characters for the first character stream, producing an partial encoded item associated with a type of construct being processing within the current state machine, such that the intermediate representation of the markup language constructs associated with the first character stream indicates a transition of processing of the first markup processing session to the second markup processing session by the set of state machines;

saving the state of the first markup processing session for the first character stream in a first session state;

determining if a second session state exists that is associated with the second markup processing session, and if so, loading the second session state for use by the set of state machines; and performing, for sequences of characters of a character stream of the second markup processing session, the operations of receiving the character stream of markup language data, applying the sequences of characters of the character stream of the second markup processing session to a set of state machines, and producing an intermediate representation of the markup language constructs identified by the sequence of characters of the second character stream of markup language data.

24. The character processor device of claim 13 wherein operating a primary state machine to control invocation of the respective construct state machines comprises:

detecting a sequence of characters representative of a data type definition (DTD) element and invoking a DTD element state machine; and operating the DTD element state machine to produce at least one DTD data element encoded item containing type, length, value representations for at least one of:

a DTD Name a DTD Public ID a DTD System ID a DTD Subset.

25. The character processor device of claim 13 wherein when the logic processing performs the operation of:

detecting the well-formedness of the markup language data by comparing representations of at least one of the prefix and suffix portions of the end element to stored representations of at least one of a prefix and suffix portion of a start element previously detected in the character stream of markup language data for validation of the end element;

storing the start element prefix and suffix in registers; and providing valid bits associated with the registers such that the character processor is notified that an end element is compared properly.

26. A computer program product having a computer-readable medium including computer program logic encoded thereon that, when executed on processor within a computerized device, provides a character processor that processes extensible markup language (XML) data by performing the operations of:

receiving a character stream of markup language data;

applying sequences of characters of the character stream to a set of state machines, the set of state machines including a plurality of construct state machines responsible for processing respective XML constructs identified by the sequences of characters;

operating a character provider in a character processor to provide characters from the character stream to the set of state machines;

operating a primary state machine to control to control invocation of the respective construct state machines to process different types of XML constructs encountered during reception of the character stream of XML data; and producing, from application of the sequences of characters to the set of state machines, an intermediate representation of the markup language constructs identified by the sequence of characters of the character stream of markup language data, the intermediate representation containing encoded items including type, length, value including type, length, value representations of the XML constructs and representative of the original stream of XML data.

27. The computer program product of claim 26 wherein when the computer program logic causes the character processor to apply sequences of characters of the character stream to a set of state machines, the computer program logic further includes code to cause the character processor to perform the operation of:

operating a primary state machine to control to control invocation of the respective construct state machines to process different types of XML constructs encountered during reception of the character stream of XML data.

28. A method for processing extensible markup language (XML) data, the method comprising:

receiving a character stream of markup language data;

applying sequences of characters of the character stream to a set of state machines, the set of state machines including a plurality of construct state machines responsible for processing respective XML constructs identified by the sequences of characters;

operating a character provider in a character processor to provide multiple characters from the character stream per state machine cycle to the set of state machines;

operating a primary state machine to control to control invocation of the respective construct state machines to process different types of XML constructs encountered during reception of the character stream of XML data; and producing from application of the sequences of characters to the set of state machines, an intermediate representation of the markup language constructs identified by the sequence of characters of the character stream of markup language data, the intermediate representation having encoded items including type, length, value representations of the XML constructs and representative of the original stream of XML data.

* * * * *